United States Patent [19]
Kokubo et al.

[11] Patent Number: 5,067,743
[45] Date of Patent: Nov. 26, 1991

[54] PRESSURE CONTROL SYSTEM FOR SUSPENSION

[75] Inventors: Kouichi Kokubo, Nagoya; Shinichi Tagawa; Masaki Kawanishi, both of Toyota; Kunihito Sato, Susono; Shuuichi Buma, Toyota; Takashi Yonekawa, Mishima; Toshio Aburaya, Toyota, all of Japan

[73] Assignees: Toyota Jidosha Kabushiki Kaisha, Kariya; Aisin Seiki Kabushiki Kaisha, Toyota, both of Japan

[21] Appl. No.: 572,621

[22] Filed: Aug. 27, 1990

[30] Foreign Application Priority Data

Aug. 28, 1989 [JP] Japan .................................. 1-221243

[51] Int. Cl.⁵ .............................................. B60G 11/26
[52] U.S. Cl. .................................... 280/707; 280/840; 364/424.05
[58] Field of Search ................. 280/804, 6.1, 707, 840; 364/424.05

[56] References Cited

U.S. PATENT DOCUMENTS 4,821,191 4/1989 Ikemoto et al. .................... 364/424.1
4,861,068 8/1989 McCabe ............................... 280/707
4,867,474 9/1989 Smith ................................... 280/707
4,905,152 2/1990 Kawabata ....................... 364/424.05

Primary Examiner—Kenneth R. Rice
Attorney, Agent, or Firm—Burns, Doane, Swecker & Mathis

[57] ABSTRACT

A suspension pressure control system applies a pressure which is proportional to a current level supplied to a solenoid of a pressure control valve to a shock absorber associated with a suspension from the valve through a cut valve, which cuts off a fluid path from the pressure control valve to the shock absorber when a line pressure is below a predetermined value and communicates the fluid path when the line pressure exceeds the predetermined value. An electronic controller controls the current level to maintain an attitude of a vehicle substantially constant in spite of any change of longitudinal and lateral acceleration, which are detected by acceleration sensors. In order to prevent an abrupt or abnormal change of the pressure of the shock absorber at an initiation of the pressure control of the controller when the vehicle is parking on a slope, the controller initiates the pressure control before the cut valve communicates the fluid path.

5 Claims, 21 Drawing Sheets

Fig. 10d

TABLE 11 — Ges vs Vs (Km/h), Ss (%/msec), HIGH

TABLE 12 — Kgs vs Ss (%/msec), values 1, 50, 400

INVERSE CONVERSION INTO ABSORBER PRESSURE CORRECTIONS (C) → | GES → Ges | 65

Block 66:
$$EHfL \leftarrow EHfL + Kgfl \cdot (1/4) \cdot [-CGP + Kcgrf \cdot CGR + Kgefl \cdot GES]$$
$$EHfr \leftarrow EHfr + Kgfr \cdot (1/4) \cdot [-CGP - Kcgrf \cdot CGR - Kgefr \cdot GES]$$
$$EHrL \leftarrow EHrL + KgrL \cdot (1/4) \cdot [CGP + Kcgr \cdot CGR - KgerL \cdot GES]$$
$$EHrr \leftarrow EHrr + Kgrr \cdot (1/4) \cdot [CGP - Kcgr \cdot CGR + Kgerr \cdot GES]$$

CORRECTION COEFFICIENTS FOR DIFFERENT PIPING LENGTHS:
$Kgfl = Kfl \cdot Kgs$
$Kgfr = Kfr \cdot Kgs$
$KgrL = KrL \cdot Kgs$
$Kgrr = Krr \cdot Kgs$

CALCULATE TARGET ABSORBER PRESSURES

Block 67:
$EHfL \rightarrow EHfL + PFLo$
$EHfr \rightarrow EHfr + PFRo$
$EHrL \rightarrow EHrL + PRLo$
$EHrr \rightarrow EHrr + PRRo$

RETURN

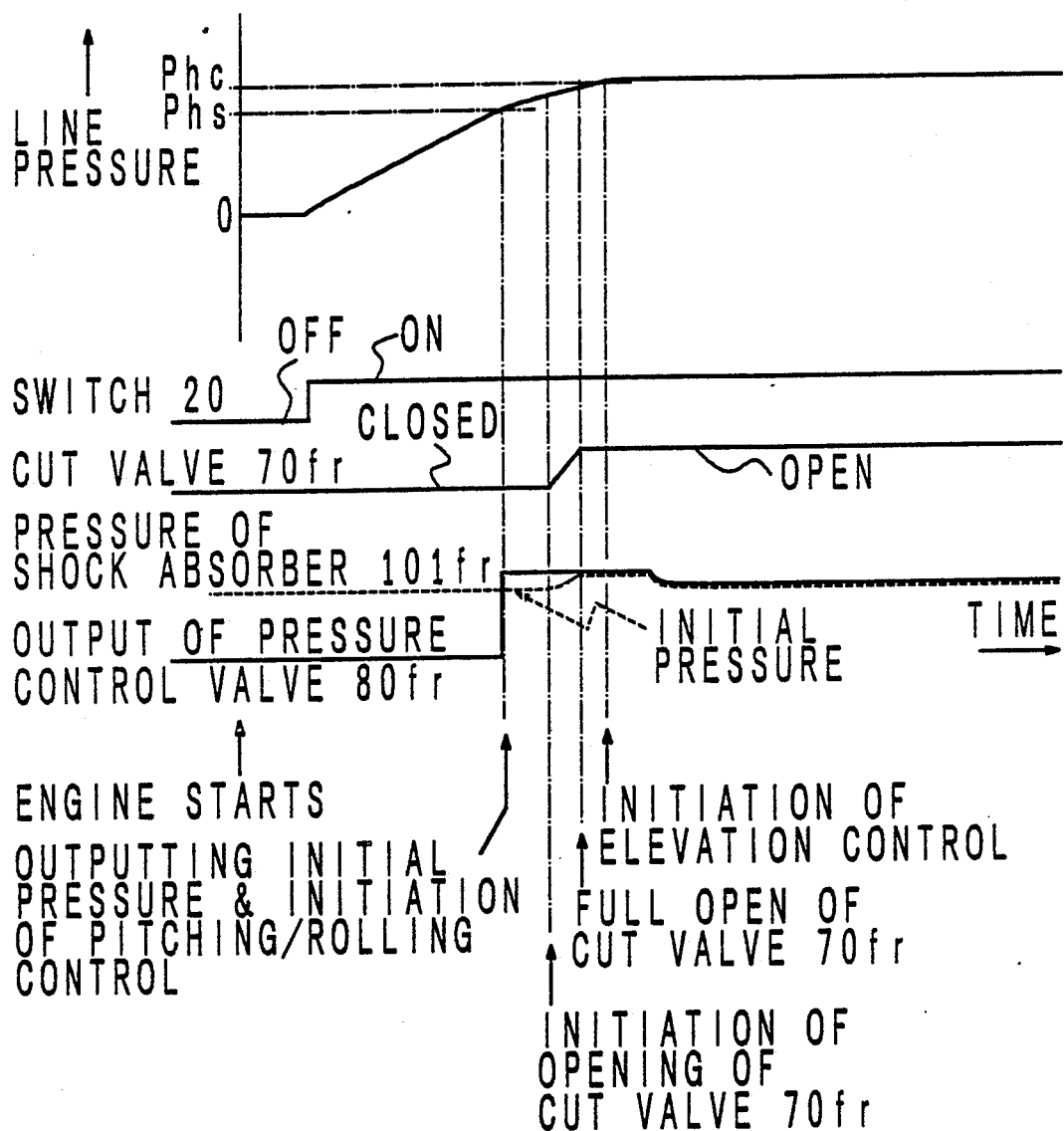

PRESSURE CONTROL SYSTEM FOR SUSPENSION

FIELD OF THE INVENTION

The invention relates to a pressure control of vehicular suspension, in particular, to a system which controls a suspension pressure in a manner to suppress a change in the attitude of a car body as caused by a steering operation or acceleration/deceleration thereof.

Japanese Laid-Open Patent Application No. 106,133/1988 discloses a pressure control system in which a turning pattern of a vehicle is determined on the basis of a steering angle and a steering angular velocity, and is utilized to modify a constant of proportionality or gain which is to be applied to a corrected suspension pressure, and a required suspension pressure is calculated in accordance with a gain and a lateral acceleration of the vehicle so as to supply the required pressure to the suspension.

However, when an attitude control system having an acceleration detector for detecting an acceleration of the vehicle for compensating the suspension pressure so as to suppress a change of the attitude of the vehicle due to the acceleration of the vehicle is employed and when the vehicle is parked on a slope or in an attitude in which a front or rear wheel is on an edge of a sidewalk, namely the vehicle is parked in an inclined attitude, a suspension pressure at a wheel which is at lower position of the inclination may change abruptly causing a disturbance of the attitude of the vehicle and arising a shock to a driver on the vehicle when the vehicle starts.

CROSS-REFERENCE TO RELATED PATENT APPLICATIONS

The present patent application is one of a group of copending patent applications which concern the same overall pressure control system or modifications thereof but which individually claim different inventive concepts embodied. These related patent applications are specifically incorporated by reference herein, and are more particularly described as follows:

(1) application Ser. No. 458,240 now U.S. Pat. No. 4,957,309 entitled "Pressure Control System for Suspension", filed on Dec. 27, 1989, the inventors being Messrs. Osamu Komazawa et al;

(2) application Ser. No. 457,957 now U.S. Pat. No. 5,024,459 entitled "Pressure Control System for Suspension", filed on Dec. 27, 1989, the inventors being Messrs. Kouichi Kokubo et al;

(3) Application Ser. No. 475,268 presently pending entitled "Pressure Control System for Suspension", filed on Feb. 5, 1990, the inventors being Messrs. Tsukasa Watanabe et al;

(4) Application Ser. No. 503,627 now U.S. Pat. No. 5,031,663 entitled "Pressure Control Valve Device", filed on Apr. 3, 1990, the inventors being Messrs. Masahiro Fukuta et al.

SUMMARY OF THE INVENTION

It is an object of the invention to reduce the abrupt change of the suspension pressure.

According to studies by the inventors of the invention, the abrupt change of the suspension pressure is due to the acceleration detector and the compensation of the suspension pressure responding to an acceleration detected by the detector. The acceleration detector have a plump which is supported so as to move or incline freely and means for detecting a position or an inclination angle of the plumb as the acceleration of the vehicle. Thus the detector is an inclination detector on a point of its construction, whereby the acceleration detector generates a signal which denotes an acceleration when the vehicle is at rest on a slope and has no acceleration which may arise during driving of the vehicle.

A pressure control system of the invention has a pressure control valve which is interposed between an actuator in a suspension mechanism and a pressure source and a cut valve which cuts off a fluid path from the pressure control valve to the actuator when a pressure of the pressure source is below a predetermined value and communicates the fluid path when the pressure of the pressure source exceeds the predetermined value. The system of the invention further comprises an acceleration detector which detects an acceleration of a vehicle body on the suspension mechanism and an electronic controller.

The electronic controller initiates, before the cut valve communicates the fluid path from the pressure control valve to the actuator, an attitude control in which the controller calculate a pressure compensation value in accordance with an acceleration detected by the acceleration detector for suppressing a change of an attitude of the vehicle body which might caused by the acceleration of the vehicle body and indicates an adjustment of a pressure by the calculated compensation value to the pressure control valve.

The attitude control of the electronic controller, before the cut valve communicates the fluid path, do not change the pressure in the actuator of the suspension mechanism, whereby the attitude of the vehicle body do not change even if the vehicle on a slope and the acceleration detector indicates a high acceleration value. Because the cut valve is closed.

When the pressure of the pressure source raises and the cut valve communicates the fluid path from the pressure control valve to the actuator, the pressure of the actuator in the suspension mechanism may be changed due to the attitude control of the electronic controller. However an initial pressure compensation operation of the electronic controller responding to the acceleration indicated by the acceleration detector is converging to a rest or a saturation and the compensation value of the pressure is relatively small, whereby a change of the pressure in the actuator when the cut valve communicates is small. Thus an abrupt change of the pressure in the actuator at the initiation of the pressure control is suppressed.

Other objects and features of the invention will become apparent form the following description of an embodiment thereof with reference to the drawings.

BRIEF DESCRIPTION OF THE DRAWINGS

FIG. 2 is a longitudinal section, to an enlarged scale, of a suspension 100fr shown in FIG. 1a;

FIG. 3 is a longitudinal section, to an enlarged scale, of a pressure control valve 80fr shown in FIG. 1a;

FIG. 4 is a longitudinal section, to an enlarged scale, of a cut valve 70fr shown in FIG. 1a;

FIG. 5 is a longitudinal section, to an enlarged scale, of a relief valve 60fr shown in FIG. 1a;

FIG. 6 is a longitudinal section, to an enlarged scale, of a main check valve 50 shown in FIG. 1a;

FIGS. 9a, 9b and 9c are flow charts illustrating a control operation by a microprocessor 17 shown in FIG. 8a;

FIGS. 10a, 10b, 10c, 10d, 10e, 10f and 10g are flow charts showing subroutines shown in FIG. 9c in detail;

FIGS. 11a and 11b graphically show data content which is written into an internal ROM of CPU 17 shown in FIG. 8a; and FIG. 12 graphically shows a change of an output pressure of the pressure control valve 80fr and a change of the pressure in the suspension before and after the cut valve 70fr communicates.

DESCRIPTION OF PREFERRED EMBODIMENT

Figure 1A:
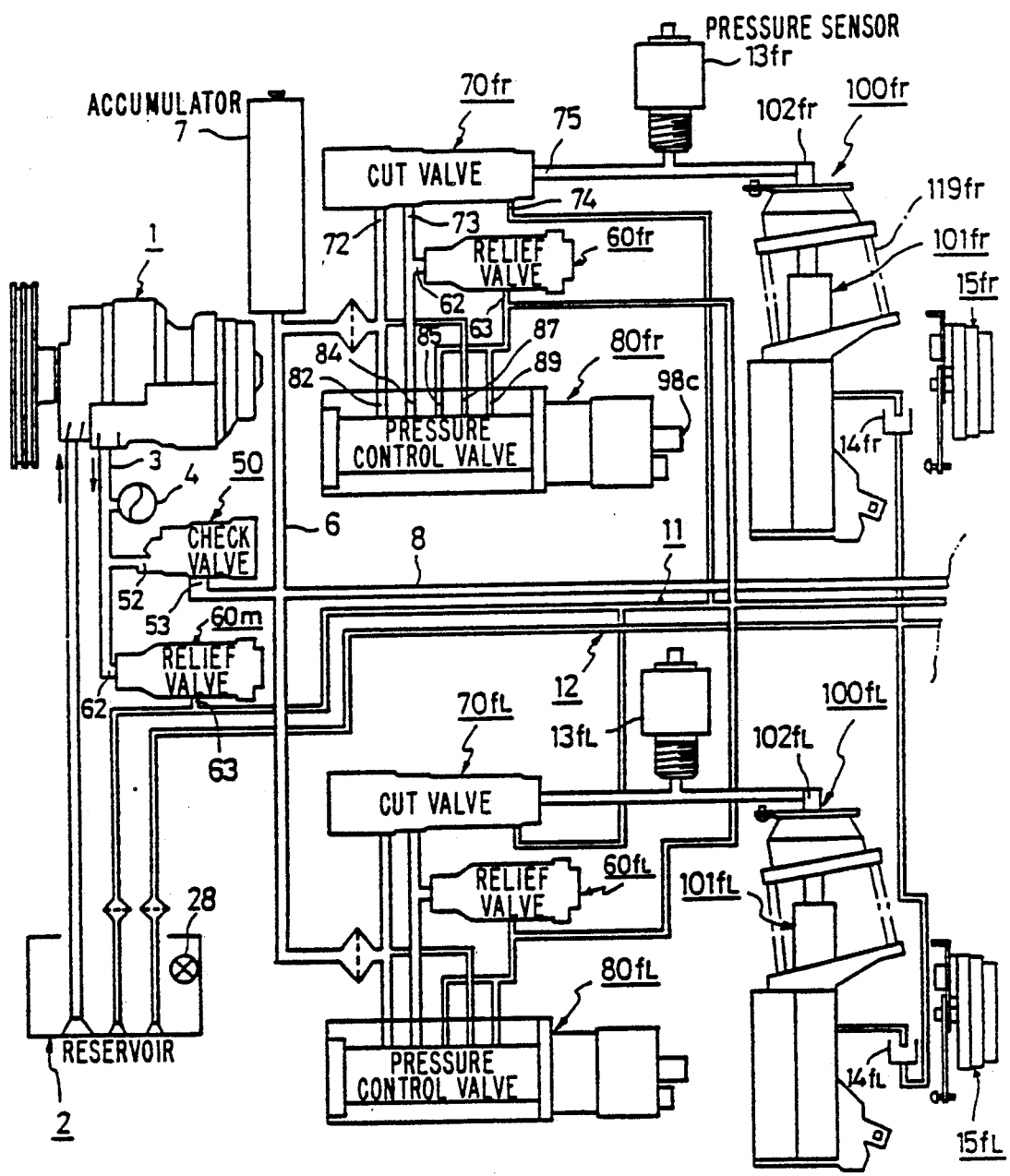
FIGS. 1a and 1b are block diagrams of a suspension pressure feeding system according to a first embodiment of the invention, each Figure representing one of halves of a single system.
Figure 1B:
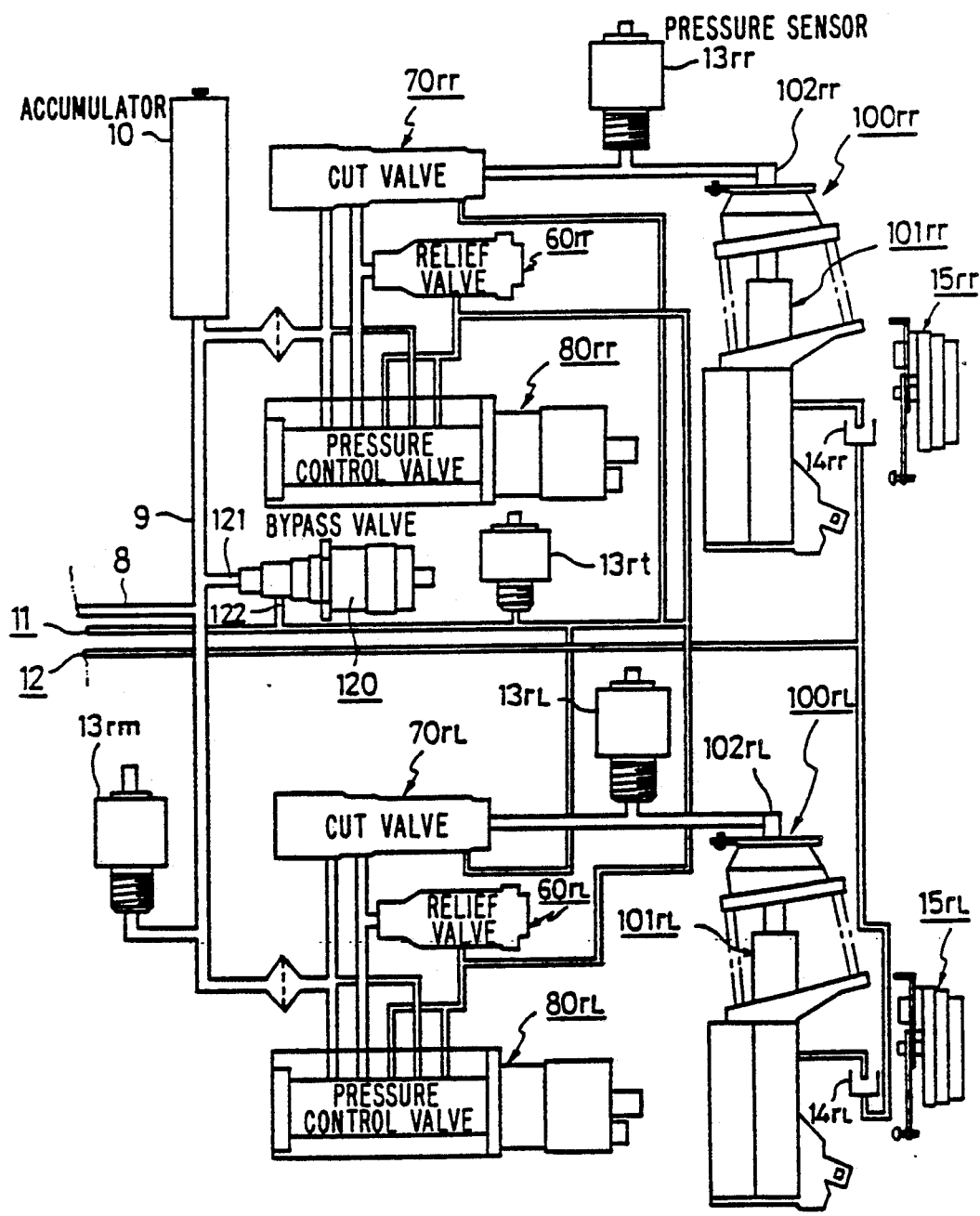

FIGS. 1a and 1b show a mechanical arrangement of an apparatus which supports a carrosserie or car body. An oil pressure pump 1, which is of radial type, is disposed within an engine room, and is driven for rotation by an onboard engine, not shown, thus drawing an oil from a reservoir 2 and discharging a given flow rate of oil to a high pressure port 3 at a rotational speed equal to or greater than a given value.

High pressure port 3 of the radial pump is connected to an accumulator 4 which serves suppressing pulsations, to a main check valve 50 and to a relief valve 60m. A high pressure oil from the port 3 is fed to a high pressure piping 8 through the valve 50. The check valve 50 blocks a reverse flow of the oil from the piping 8 to the port 3 whenever the port 3 assumes a lower pressure than the piping 8. The relief valve 60m drains the port 3 to a reservoir return piping 11, which represents one of the port 3 assumes a greater than a given value, thus maintaining the pressure of the port 3 substantially at a given pressure.

The high pressure feed piping 8 communicates with a front wheel high pressure feed piping 6 which feeds a high pressure to front wheel suspensions 100fL, 100fr, and a rear wheel high pressure feed piping 9 which feeds high pressure to rear wheel suspensions 100rL, 100rr. The piping 6 communicates with an accumulator 7 for the front wheels while the piping 9 communicates with an accumulator 10 for the rear wheels.

The piping 6 is also connected to a pressure control valve 80fr through an oil filter, and the valve 80fr is effective to regulate or reduce the pressure from the piping 6, which will be hereinafter referred to as a front wheel line pressure, to a required pressure before supplying it to a cut valve 70fr and a relief valve 60fr. The required pressure is substantially proportional to a current level which is used to energize an electrical coil of the valve 80fr and represents a suspension sustain pressure.

When the pressure of the piping 6 or the front wheel line pressure is below a given value, the cut valve 70fr interrupts a communication between the output port 84 (to the suspension) of the pressure control valve 80fr and a hollow piston rod 102fr associated with a shock absorber 101fr of the suspension 100fr, thus preventing the pressure of the piston rod 102fr from being released to the pressure control valve 80fr. When the front rear line pressure remains at or above the given value, the cut valve 70fr allows the output pressure from the pressure control valve 80fr to be directly fed to the piston rod 102fr.

The relief valve 60fr restricts the internal pressure of the shock absorber 101fr at or below an upper limit. Specifically, when the suspension sustain pressure from the output port 84 of the pressure control valve 80fr exceeds a given high pressure, the output port 84 is drained to the reservoir return path or piping 11, thus maintaining the output port of the valve 80fr substantially at or below the given high pressure. The relief valve 60fr is also effective to provide a buffering action upon the transmission to the pressure control valve 80fr of any shocking rise in the internal pressure of the shock absorber 101fr, as when a front, right wheel of the vehicle strikes against a bump on the road. In response to such rise, the internal pressure of the shock absorber 101fr is drained to the reservoir return path 11 through the piston rod 100fr and the cut valve.

The suspension 100fr essentially comprises the shock absorber 101fr and a coiled suspension spring 119fr, and operates to maintain a car body at an elevation relative to the front, right wheel, which corresponds to the pressure supplied to the shock absorber 101fr from the output port 84 of the pressure control valve 80fr through the piston rod 102fr, or a pressure which is regulated by the pressure control valve 80fr or the suspension sustain pressure.

The sustain pressure fed to the shock absorber 101fr is detected by a pressure sensor 13fr, which produces an analog signal representing a detected sustain pressure. A vehicle elevation sensor 15fr is mounted on the car body adjacent to the suspension 100fr, and includes a rotor connected to a link which is coupled to the front, right wheel. In this manner, the sensor 15fr produces a digital data representing the elevation of a car body with respect to the front, right wheel.

In a similar manner, a suspension 100fL associated with a front, left wheel is equipped with a pressure control valve 80fL, a cut valve 70fL, a relief valve 60fL, a vehicle elevation sensor 50fL, and a pressure sensor 13fL. The pressure control valve 80fL is connected to the front wheel high pressure feed piping 6, thus feeding a required pressure to the piston rod 102fL of the shock absorber 101fL of the suspension 100fL.

Furthermore, a suspension 100rr associated with a rear, right wheel is equipped with a pressure control valve 80rr, a cut valve 70rr, a relief valve 60rr, a vehicle elevation sensor 15rr and a pressure sensor 13rr. The valve 80rr is connected to the rear wheel high pressure feed piping 9, feeding a required pressure to the piston rod 102rr of a shock absorber 101rr of the suspension 100rr.

Finally, a suspension 100rL associated with a rear, left wheel is equipped with a pressure control valve 80rL, a cut valve 70rL, a relief valve 60rL, a vehicle elevation sensor 15rL and a pressure sensor 13rL. The pressure control valve 80rL is connected to the rear wheel high pressure feed piping 9, feeding a required pressure to the piston rod 102rL of a shock absorber 101rL of the suspension 100rL.

In this embodiment, an engine is mounted on the front wheel side, and accordingly the pump 1 is also mounted on the front wheel side or in the engine room, whereby the length of pipings from the pump 1 to the rear wheel suspensions 100fr, 100fL. Accordingly, a pressure drop caused by the piping path is greater for the rear wheels, and if an oil leakage occurs in the piping, the pressure drop will be greatest for the rear wheels. Accordingly, a line pressure detecting sensor 13rm is connected to the rear wheel high pressure feed piping 9. On the other hand, the pressure of the reservoir return path 11 will be lowest at its end located nearer the reservoir 1, and will tend to increase in a direction away from the reservoir 2. Accordingly, the pressure of the reservoir return path 11 is also detected by a pressure sensor 13rr which is located toward the rear wheel.

The piping is connected to a bypass valve 120, which is effective to regulate a pressure in the high pressure feed piping 8 to a valve 4 which corresponds to a current level used to energize an electrical coil of the valve 120, thus obtaining a required line pressure. When an ignition switch is opened to stop the operation of the engine and hence the pump 1, the line pressure is reduced substantially to zero or drained through the reservoir return path 11 to the atmospheric pressure which prevails in the reservoir 2, thus reducing the loading upon the engine or pump when restarting. The reduction in the line pressure turns the cut valves 70fr, 70fL, 70rr, 70rL off, thus preventing a pressure release from the shock absorbers.

Figure 2:
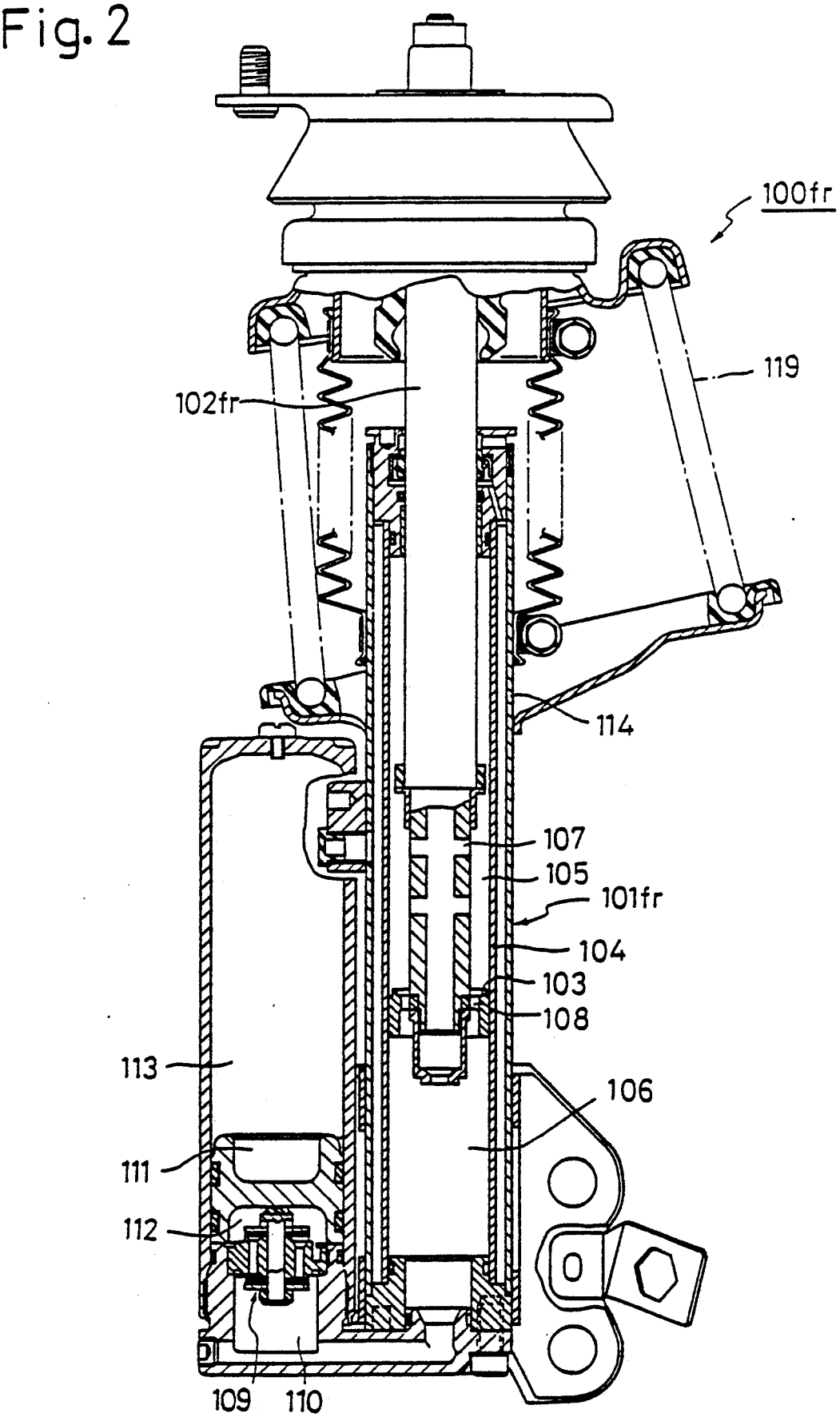

FIG. 2 shows a longitudinal section, to an enlarged scale, of the suspension 100fr. A piston 103 is fixedly mounted on the piston rod 102fr of the shock absorber 101fr, and extends through an inner sleeve 104 to divide its interior into an upper chamber 105 and a lower chamber 106. An oil pump pressure which represents the suspension sustain pressure is fed to the piston rod 102fr from the output port of the cut valve 70fr, which pressure is passed through a side opening 107 in the piston rod 102fr to be applied to the upper chamber 105 disposed inside the inner sleeve 104, and thence passed through a vertical through-opening 108 formed in the piston rod 103 to be applied to lower chamber 106. A sustain pressure which is proportional to the product of the pressure applied to the lower chamber 106 and cross-sectional area (the square of the rod radius multiplied by $\pi$) of the piston rod 102fr is applied to the piston rod 102fr.

The lower chamber 106 communicates with a lower space 110 in an attenuator valve unit 109, which has an upper space that is divided by a piston 111 into a lower chamber 112 and an upper chamber 113. An oil from the lower space 110 passes through the valve unit 109 into the lower chamber 112 while a high pressure gas is confines in the upper chamber 113.

If the piston rod 102fr plunges rapidly downward into the inner sleeve 104 as a result of a bumping reaction of the front, right wheel, the internal pressure of the inner sleeve 104 increases rapidly, and similarly, the pressure in the lower space 110 tends to increase above the pressure in the lower pressure 112 rapidly. At this time, oil flows from the lower space 110 into the lower chamber 112 through a check valve which permits a flow of the oil from the lower space 110 to the lower chamber 112 above a given pressure differential across the valve unit 109, but which blocks a passage of the oil in the opposite direction, whereby the piston 111 moves up, thus buffering the transmission of upward impact applied from the wheel to the piston rod 102fr. In this manner, the transmission of bumping effect of the wheel to the car body is buffered.

If the piston rod 102fr tends to be withdrawn upwardly from within the inner sleeve 104 as the front, right wheel goes down rapidly, the internal pressure of the inner sleeve 104 reduces rapidly, again causing the pressure of the lower space 110 to be rapidly reduced below the pressure of the lower chamber 112. At this time, oil flows from the lower chamber 112 to the lower space 110 through a check valve which permits a flow of the oil from the lower chamber 112 to the lower space 110 above a given pressure differential across the valve unit 109, but which blocks a passage of the oil in the opposite direction, whereby the piston 111 moves down, buffering the transmission of downward impact applied from the wheel to the piston rod 102fr. In this manner, the transmission of impact applied to the wheel or falling effect to the car body is buffered.

As the pressure applied to the shock absorber 101fr increases in order to increase the vehicle elevation, the pressure in the lower chamber 112 rises, which in turn causes the piston 111 to be raised, allowing the latter to assume a position which corresponds to a loading upon the car body.

When there is no vertical movement of the piston rod 102fr relative to the inner sleeve 104 as during a parking condition, a seal between the inner sleeve 104 and the piston rod 102fr prevents any substantial oil leakage from the inner sleeve 104 to an outer sleeve 114. However, it is desirable that such seal exhibits a sealing characteristic which permits a very limited amount of oil leakage during the vertical movement of the piston rod 102fr in order to reduce a resistance presented to such movement of the rod 102fr. Any oil leaking to the outer sleeve 114 is returned to the reservoir 2 through a drain 14fr (FIG. 1a) which is open to the atmosphere and a drain return piping 12 (FIG. 1a), which represents a second return path. The reservoir 2 is equipped with a level sensor 28 (FIG. 1a), which produces an oil shortage signal when the oil level within the reservoir 2 is below a lower limit.

It should be understood that other suspensions 100fL, 100rr and 100rL are constructed in substantially the same manner as the suspension 100fr mentioned above.

Figure 3:
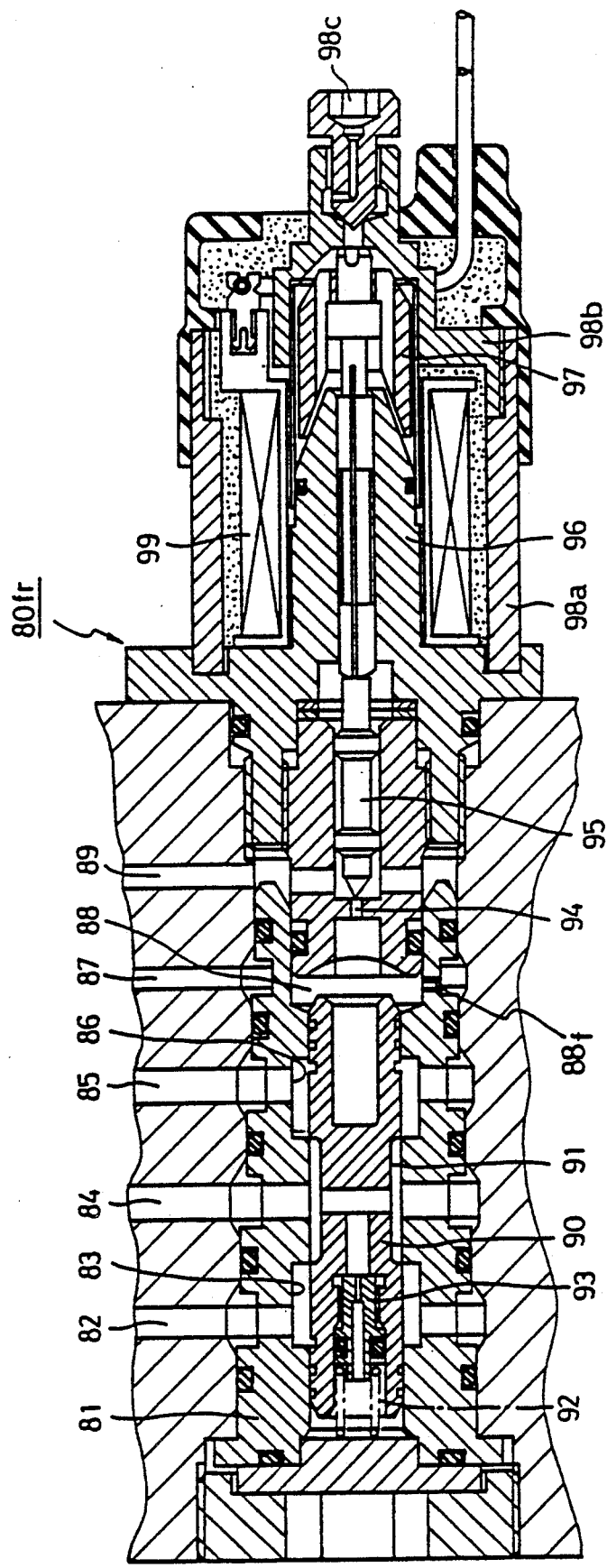

FIG. 3 shows a longitudinal section, to an enlarged scale, of the pressure control valve 80fr. It includes a sleeve 81, which is centrally formed with a spool receiving opening, the inner surface of which is formed with an annular groove 83 communicating with a line pressure port 82 and another annular groove 86 communicating with a low pressure port 85. An output port 84 opens into the sleeve at a location intermediate the both annular grooves 83, 86. A spool 90 is inserted into the spool receiving opening, and intermediate its length, its peripheral surface is formed with an annular groove 91 having a width which corresponds to the distance between a right edge of the groove 83 and a left edge of the groove 86. The left end of the spool 90 is formed with a valve receiving opening, which communicates with the groove 91, and into which a valve element 93 is inserted and held in place by a coiled compression spring 92. The valve element 93 is centrally formed with an orifice extending therethrough, which provides a communication between the space in which the groove 91 and hence the output port 84 is located and the space in which the valve element 93 and the spring 92 are received. Accordingly, at its left end, the spool 90 is subject to a pressure from the output port 84 or a regulated pressure which is applied to the suspension 100fr, whereby it is urged to the right. In the event a pressure from the output port 84 increases in an impulse manner, the valve element 93 is driven to the left against the resilience of the spring 92, creating a buffering space to the right of the valve element 93. Accordingly, when the pressure from the output port 94 rises in an impulse manner, such pressure rise is not immediately applied to the left end face of the spool 90, and thus the valve element 93 provides a buffering action upon a movement of the spool 90 to the right in response to an impulse-like pressure rise, or pressure surge from the output port 84. Conversely, it also exerts a buffering action upon a movement of the spool 90 to the left in response to an impulse-like pressure fall from the output port 84.

The right end face of the spool 90 is subject to a pressure from a target pressure space 88 communicating with a high pressure port 87, which pressure is supplied through an orifice 88f, whereby the spool 90 is urged to the left. A lime pressure is fed to the high pressure port 87 while the target pressure space 88 communicates with a low pressure port 89 through a channel 94, the channel opening of which is determined by a needle valve 95. When the needle valve 95 closes the channel 94, the target pressure space 88 which communicates with the high pressure port 87 through the orifice 88f assumes the line pressure of the port 87, whereby the spool 90 is driven to the left, allowing the groove 91 in the spool 90 to communicate with the groove 83 or the line pressure port 82 thus causing the pressure of the port 91 or output port 84 to rise which is then transmitted to the left of the valve element 93, thus imparting a rightward driving force to the left end of the spool 90. When the needle valve 95 is located to leave the channel 94 fully open, the pressure from the space 88 will be substantially reduced below the line pressure from the high pressure port 87 because of the restriction presented by the orifice 88f. Accordingly, the spool 90 moves to the right, allowing the groove 91 in the spool 90 to communicate with the groove 86 or the low pressure port 85, reducing the pressure in the port 91 or the output port 84. Such pressure is transmitted to the left of the valve element 93, thus reducing the rightward driving force which is applied to the left end of the spool 90. In this manner, the spool 90 assumes a position where the pressure from the target pressure which is substantially proportional to the pressure from the target pressure space 88 appears at the output port 84.

The pressure in the target pressure space 88 is determined by the position of the needle valve 95, which is in turn substantially in inverse proportion to the distance of the needle valve 95 from the channel 94, and hence there appears at the output port 84 a pressure which is substantially inversely proportional to the distance of the needle valve 95.

A stationary core 96 of magnetizable material is shaped to allow the needle valve 95 to extend therethrough, and has a right end which is in the form of truncated cone, which is opposed by a conical end face of a plunger 97, also formed of a magnetizable material, which defines an opening having a closed bottom. The needle valve 95 is secured to the plunger 97. The core 96 and the plunger 97 extend into a bobbin which carries an electrical coil 99 thereon.

When the coil 99 is energized, there is established a loop for a magnetic flux comprising the core 96, a yoke of magnetizable material 98a, an end plate of a magnetizable material 98b and the plunger 97 and then back to the core 96. The plunger 97 is attracted toward the core 96 and thus moves to the left, bringing the needle valve 95 closer to the channel 94 or reducing the distance mentioned above. It will be noted that the left end of the needle valve 95 is subject to a pressure from the target pressure space 88 which acts to drive it to the right while the right end of the needle valve 95 is subject to the atmospheric pressure through a low pressure port 98c which is open to the atmosphere, so that the needle valve 95 will be driven to the right by the pressure from the target pressure space 88 with a force which depends on the magnitude of such pressure (it will be noted that this corresponds to the position of the needle valve 95). As a consequence, the needle valve 95 is spaced from the channel 94 by a distance which is virtually inversely proportional to the current level which is used to energize the coil 99. One of the core and the plunger is shaped as a truncated cone while the other is shaped as a complementary conical opening in order to achieve a linear relationship between the current level and distance.

As a consequence of such arrangement, there appears an output at the output port 84 which is substantially proportional to the current level used to energize the coil 99. The pressure control valve 80fr delivers at the output port 84 which is proportional to the current level within a given range.

When the coil 99 is energized with a current level for maintaining the height of the vehicle to a desired level and when a wheel associated with the suspension 100fr rides on a hill on a bumpy road and rises up, the pressure of the suspension 100fr increases and consequently the pressure of the output port 84 of the pressure control valve 80fr increases to drive the spool 90 toward pressure down direction (toward right in FIG. 3), substantially eliminating a transmission of an up impact of the wheel to the body of the vehicle. The movement of the spool 90 toward right causes an increase of the pressure in the target pressure space 88. The pressure in the target pressure space 88 is applied to the top of the needle valve 95 through the channel 94. Thus the needle valve 95 goes back (moves toward right) to have a space from the channel 94. In other words, the communication from the target pressure space 88 to the return path 11 through the channel 94 and the low pressure port 89 is increased. After the rising up of the wheel, the wheel falls down and consequently the pressure of the suspension 100fr decreases, whereby the pressure of the output port 84 of the pressure control valve 80fr decreases to drive the spool 90 toward a pressure up direction (toward left in FIG. 3), substantially eliminating a transmission of a down impact of the wheel to the body of the vehicle. The movement of the spool 90 toward left causes a decrease of the pressure in the target pressure space 88, whereby the needle valve 95 goes forward (toward left) to close the channel 94 and consequently the communication of the target pressure space 88 to the return path 11 decreases. Thus the pressure in the target pressure space 88 increases.

When the wheel falls down into a hollow of a bumpy road, the pressure in the suspension 100fr decreases and consequently the spool 90 moves toward left, substantially eliminating a transmission of a down impact of the wheel to the body of the vehicle as mentioned above, and when the wheel rises up from the hollow of the bumpy road, the pressure in the suspension 100fr increases and consequently the spool 90 moves toward right, substantially eliminating a transmission of an up impact of the wheel to the body of the vehicle as mentioned above.

Figure 4:
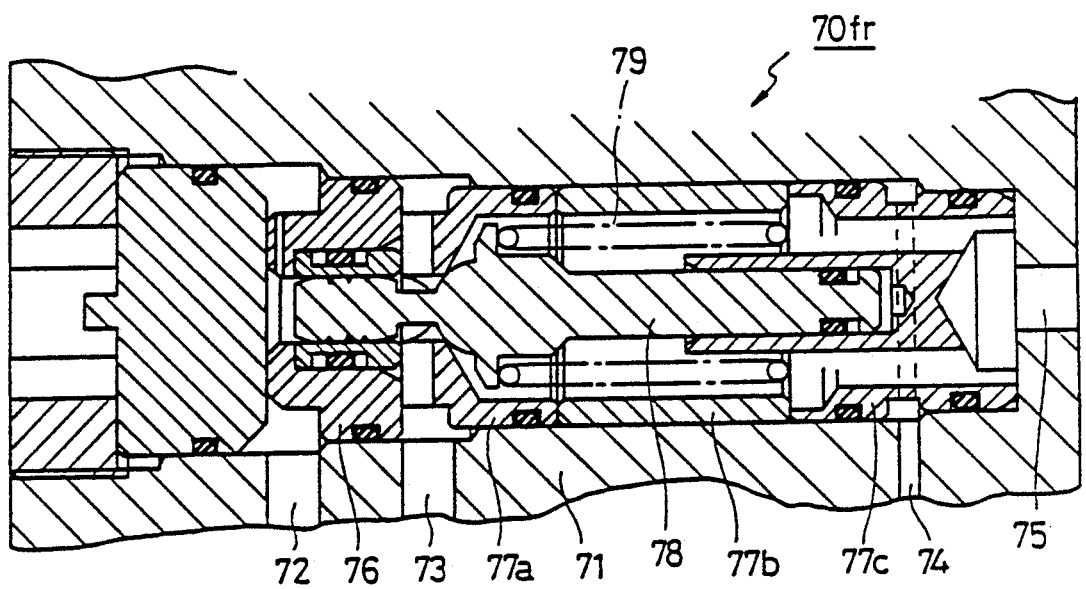

FIG. 4 shows a longitudinal section of the cut valve 70fr to an enlarged scale. It includes a valve body 71 formed with a valve receiving bore which communicates with a line pressure input port 72, a regulation input port 73, a drain hole 74 and an output port 75. An annular first guide 76 provides a partition between the ports 72 and 73, and three cylindrical guides 77a, 77b and 77c provide a partition between the ports 73 and 75. The cylindrical guide 77a is formed with a central circular path 77ao. The drain hole 74 communicates with an annular groove formed in the outer periphery of the second guide 77c, thus returning any oil which leaks to the outer periphery of these second guides 77a to 77c to the return path 11.

A spool 78 extends through the first and the second guide 76, 77a to 77c and which is urged to the left by a coiled compression spring 79. A left side head of the spool 78 is coupled hermetically to and extends through a backup ring 76b. The backup ring 76b extends through an O-ring 76o and inserted into a valve guide opening of the first guide 76 with the O-ring 76o. The O-ring 76o seals a gap between backup ring 76b and the first guide 76. There is a controlled pressure space 72a at the left end of the spool 78, which communicates with the line pressure port 72 through recesses at the left end of the first guide 76. Accordingly, a pressure in the line pressure port 72 is applied to the left end of the spool 78. An outer surface 78a of the spool 78, which faces to the circular opening 77ao of the second guide 77a is spherical. When the spool 78 moves toward left, the spherical surface 78a closes the circular opening 77ao as shown in FIG. 4. Thus the output port 75 is interrupted from the input port 73.

The second guide 77c includes a central projection 77dp having a guide hole 77dh which receives a right side end of the spool 78, a path 77ds for communicating an inner space of the second guide 77b to the output port 75 and a bottom hole 77dr. The bottom of the guide hole 77dh is communicated to the drain hole 74. The right side end of the spool 78 is inserted into the guide hole 77hd. An O-ring 77do coupled to the right side end of the spool 78 seals the gap between the bottom of the guide hole 77dh and the top opening of the guide hole 77dh. Thus the O-ring 77do prevents a fluid flow from the inner space of the second guide 77b to the return path 11 through the guide hole 77dh and the drain hole 74.

When the line pressure is below a given low value, the spool 78 is driven to its leftmost position under the resilience of the spring 79 as shown in FIG. 4, whereby a communication between the ports 75 and 73 is interrupted as a result of the spherical surface 78a of the spool 78 fully closing the internal circular opening 77ao of the second guide 77a. When the line pressure becomes equal to or greater than the given value, such pressure is effective to begin driving the spool 78 to the right against the resilience of the spring 79, and the spool 78 reaches to its rightmost position where it is fully open at a particular pressure above the given low pressure. Thus, the spool 78 moves past the inner circular opening 77ao in the second guide 77a to the right thereof, whereby a communication is established between the ports 73 and 75, and when the line pressure from the port 72 rises to the given low pressure, the cut valve 70fr begins establishing a communication between the port 73 (the regulated pressure output from the pressure control valve 80fr) and the output port 75 (shock absorber 101fr). As the line pressure from the port 72 further increases, a full communication is established between the ports 73 and 75. As the line pressure decreases, the procedure is opposite to that mentioned above, and when the line pressure decreases below the given low pressure, the output port 75 or the shock absorber 101fr is completely cut off from the regulating input port 73 or the regulated output from the pressure control valve 80fr. Stated in more detail, when the line pressure decreases below the given low pressure and consequently the spool 78 is driven toward left (in the interruption direction) the spherical surface 78a of the spool 78 attaches to the opening edge of the circular opening 77ao. Because the spherical surface 78a inclines from a distant position to the center of the opening 77ao, a hit of a point of the spherical surface 78a to the edge of the opening 77ao causes an inclination force to the spool 78 to arrange a longitudinal axis of the spool 78 to the center of the opening. This force effects on the backup ring 76b and O-ring 76o. The resilient O-ring 76o is compressed partially at a position the force is effected and remaining part of the O-ring 76o is expanded, remaining the sealing of the backup ring 76b and allowing the inclination of the spool 78. Accordingly, the spherical surface 78a of the spool 78 attaches closely to the circular edge of the opening 77ao in complete circle of the circular edge of the opening 77ao. Thus the communication between the input port 73 and the output port 75 is completely interrupted. Since the backup ring 76b inclines as the spool 78 inclines, a sliding resistance between the backup ring 76b and the spool 78 do not change substantially in spite of the inclination. Thus the movement of the spool 78 is smooth.

Figure 5:
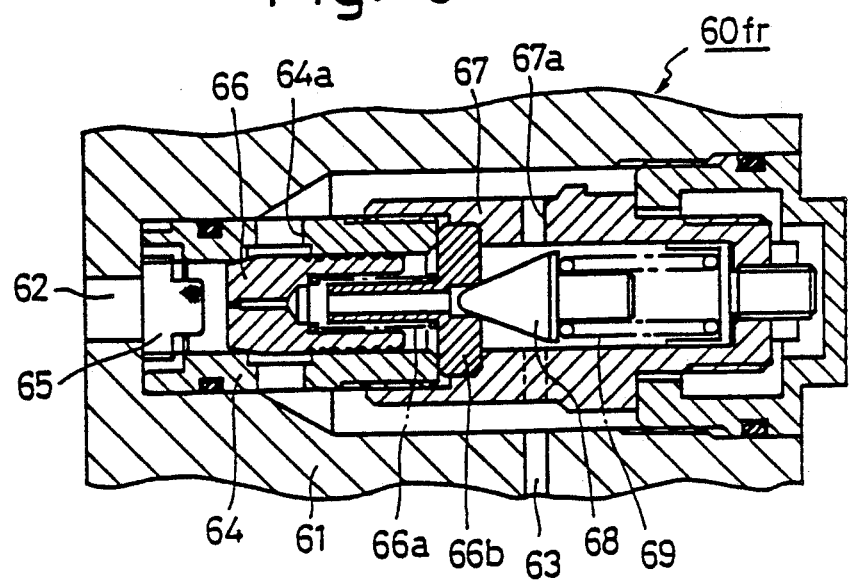

FIG. 5 shows the relief valve 60fr in an enlarged longitudinal section. It includes a valve body 61 formed with a valve receiving bore, into which an input port 62 and a low pressure port 63 open. The valve receiving opening receives a first guide 64 and a second guide 67, both of which are cylindrical in configuration, and the input port 62 communicates with the inner space of the first guide 64 through a filter 65. A valve element 66 having a centrally disposed orifice is inserted into the first guide 64, and the valve element 66 is urged to the left by a coiled compression spring 66a. The space in the first guide 64 in which the valve element 66 and the spring 66a are received communicates with the input port 62 through the orifice in the valve element 66, and also communicates with the internal space of the second guide 67 through an opening formed in a spring abutment 66b. A conical valve element 68 is urged to the left by a coiled compression spring 69 to close the opening in the spring abutment 66b. When a control pressure from the input port 62 is below a given high pressure, a space in which the spring 66a is received and which communicates with the input port 62 through the orifice in the valve element 66 assumes a pressure which is less in magnitude than the resilience of the spring 60, whereby the valve element 68 closes the central opening in the valve seat 66b, as shown in FIG. 5. Thus, the output port 62 is cut off from the internal space of the second guide 67 which communicates with the low pressure port 63 through an opening 67a. Thus the output port 62 is cut off from the low pressure port 63.

When the control pressure to the input port 62 rises to the given high pressure, the pressure which is applied to the central opening in the valve seat 66b through the orifice in the valve element 66 is effective to initiate driving the valve element 68 to the right, and when the pressure from the port 62 further increases, the valve element 68 will be driven to its rightmost position, where the pressure from the input port 62 will be discharged into the low pressure port 63, thus suppressing the control pressure around or less than the given high pressure.

When a high pressure surge is applied to the input port 62, the valve element 66 is driven to the right, whereby the input port 62 communicates with the space in the body 61 which receives the valve through a lateral opening 64a formed in the first guide 64 and thence to the low pressure port 63 having an increased channel area, thus providing a buffering action upon a rapid pressure surge applied from the input port 62.

Figure 6:
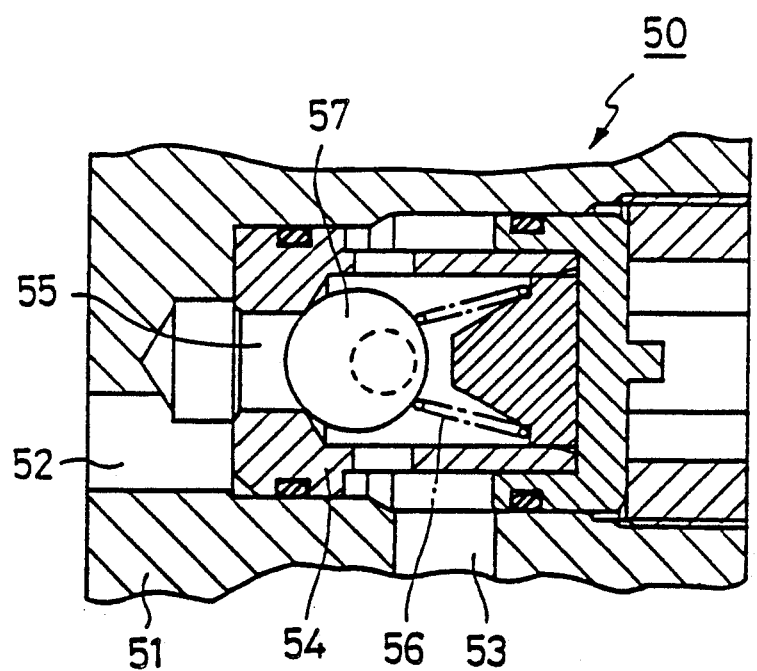

FIG. 6 is an enlarged longitudinal section of the main check valve 50. It includes a valve body 51 formed with a valve receiving bore, which communicates with an input port 52 and an output port 53. A cylindrical valve seat 54 having a closed bottom is received in the bore, and is formed with a channel opening 55, which is usually closed by a ball valve 57 as urged by a coiled compression spring 56. However, when the pressure of the input port 52 is higher than the pressure of the output port 53, the ball valve 57 is pushed back to the right by the pressure from the input port 52, thus opening the channel opening 55 to allow an oil flow in a direction from the input port 52 to the output port 53. However, when the output port 53 assumes a pressure greater than that of the input port 52, the channel opening is closed by the ball valve 57, thus blocking a reverse oil flow.

Figure 7:
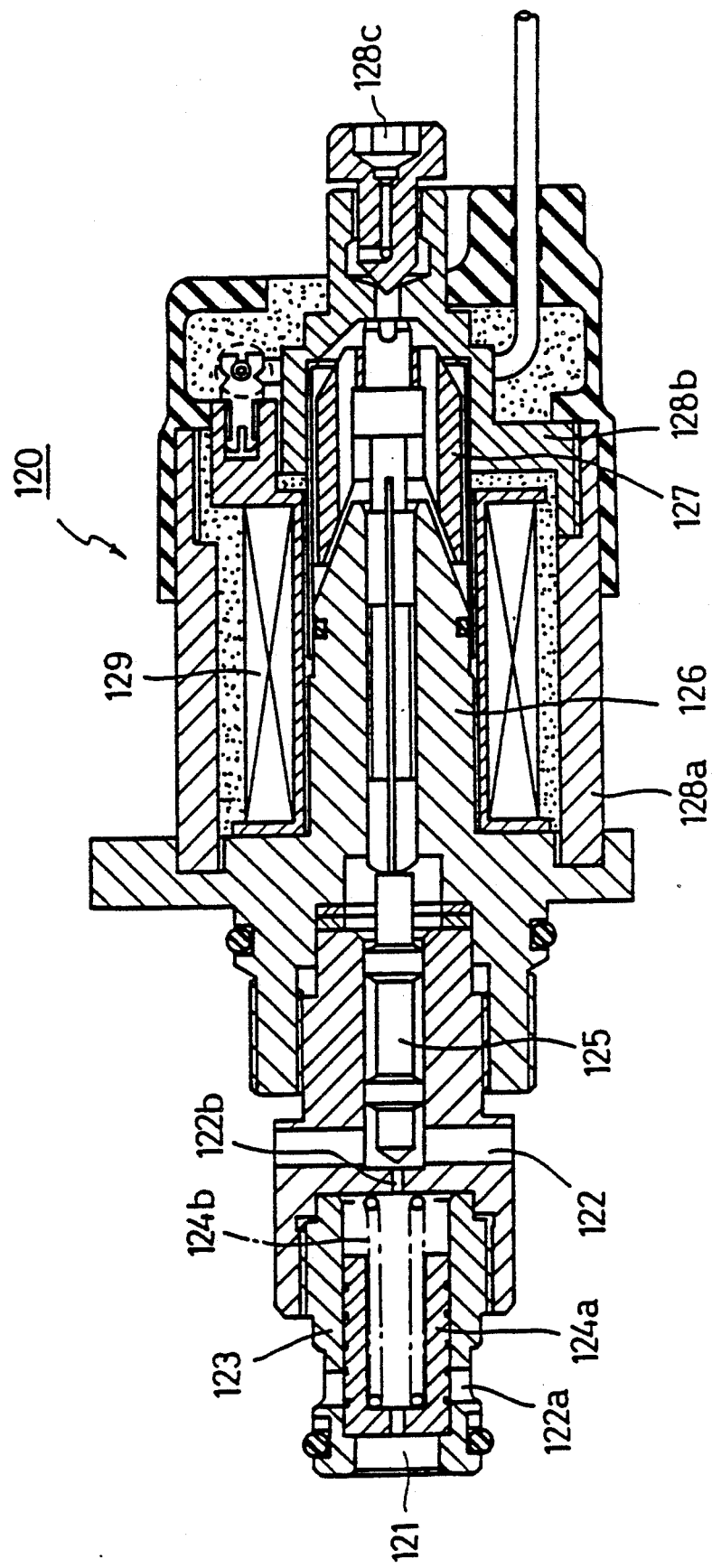
FIG. 7 is a longitudinal section, to an enlarged scale, of a bypass valve 120 shown in FIG. 1b.

FIG. 7 shows a bypass valve 120 in an enlarged longitudinal section. It includes an input port 121 which communicates with the internal space of a first guide 123, in which a valve element 124a is received and is normally urged to the left by a coiled compression spring 124b. The valve element 124a is centrally formed with an orifice in its left end face, through which the input port 121 communicates with the internal space of the first guide 123. This space communicates with a low pressure port 122 through a channel 122b, which is open or closed by a needle valve 125.

Solenoid assembly comprising components including the needle valve 125 and an electrical coil 129 has the same construction and the same size as the solenoid assembly shown in FIG. 3 including the needle valve 95 and the electrical coil 99 so as to be used in common for the pressure control valve and the bypass valve. It is designed so that the spacing of the needle valve 125 from the orifice 122b is substantially in inverse proportion to the current level which passes through the coil 129. The channel opening which the orifice 122b exhibits is in inverse proportion to the spacing, and hence the flow rate of the oil which passes from the input port 121 through the orifice of the valve element 124a, the internal space of the first guide 123 and through the orifice 122b to the low pressure port 112 is proportional to the pressure differential across the orifice formed in the left end face of the valve element 124a.

As a consequence, the pressure of the input port 121 will be substantially proportional to the current level which passes through the coil 129. The bypass valve 120 operates to provide a line pressure at the input port 121 which is proportional to the current level in a given range. When an ignition switch is off and accordingly the engine as well as the pump 1 cease to operate, the coil 129 is deenergized, whereby the needle valve 125 moves to its rightmost position, and the input port 121 or its line pressure assumes a low value which is near the return pressure.

When a high pressure surge is applied to the input port 121, the valve element 124a is driven to the right, whereby the low pressure port 122a communicating with the low pressure port 122 communicates with the input port 121. Since the low pressure port 122a has a relatively large opening, the pressure surge applied to the input port 121 is immediately discharged through the low pressure port 122a.

The relief valve 60m is constructed in the same manner as the relief valve 60fr mentioned above, but employs a coiled compression spring (69) having slightly less resilience for urging a conical valve element (68 shown in FIG. 5). Accordingly, an output port (62) is cut off from a low pressure port (63) when a pressure from an input port (62) or a pressure at the high pressure port 3 is below a given high pressure which is slightly less than a pressure at which the relief valve 60fr discharges the pressure at its input port 62 to the low pressure port 63. When the input port (62) assumes a pressure which is equal to or greater than the given high pressure, a valve element (68) is driven to its rightmost position. In this manner, the pressure from the input port (62) is discharged to the low pressure port (63), thus suppressing the pressure at the high pressure port 3 at or below the given high pressure.

In the apparatus for supporting a carrosserie as shown in FIGS. 1a and 1b, the main check valve 50 supplies oil from the high pressure port 3 to the high pressure piping 98, but blocks a reverse flow from the piping 8 to the port 3. The relief valve 60m suppresses the pressure at the high pressure port 3 or the high pressure piping 8 at or below a given high pressure, and in the event a high pressure surge is applied to the port 3, it releases such surge to the return path 11, thus buffering the transmission of a pressure surge to the piping 8.

The bypass valve 120 controls the pressure of the rear wheel high pressure feed piping 9 substantially linearly in a given range, and maintains the pressure of the piping 9 at a given value during a steady-state operation. The constant pressure control takes place by controlling the current level o the bypass valve 120 with reference to a pressure detected by the pressure sensor 13rm. In the event a high pressure surge is applied to the rear wheel suspension, the valve releases it to the return path 11, thus buffering its transmission to the piping 8. When the ignition switch is open, and the engine as well as the pump 1 cease to operate, the energization is interrupted, whereby the piping 9 is made to communicate with the return path 11, thus decompressing.

Pressure control valves 80fr, 80fL, 80rr and 80rL deliver the required sustain pressure to output ports (84) by controlling the current level of the electrical coil (99) so that the required sustain pressure is applied to the suspension through the suspension pressure control. The transmission of a pressure surge to the suspension is buffered, thus suppressing a hunting of the pressure controlling spool (91), thus allowing the pressure applied to the suspension to be stabilized.

Cut valves 70fr, 70fL, 70rr and 70rL interrupt the suspension pressure feeding line between the output port 84 of the pressure control valve and the suspension to prevent the pressure from being released from the suspension when the line pressure (front wheel high pressure feed piping 9) is below a given low pressure, and fully opens the feed line whenever the line pressure is equal to or greater than the given low pressure. In this manner, the suspension pressure is automatically prevented from going abnormally low value when the line pressure is low.

Relief valves 60fr, 60fL, 60rr and 60rL limit the pressure of the suspension feed line between the output port 84 of the pressure control valve and the suspension or principally the suspension pressure to less than an upper limit so that any high pressure surge applied to the feed line or the suspension as when the vehicle is bumped or a load of high mass is thrown onto the vehicle may be released to the return path, thus buffering the impact upon the suspension and enhancing the durability of the feed line and its connected mechanical elements.

Figure 8A:
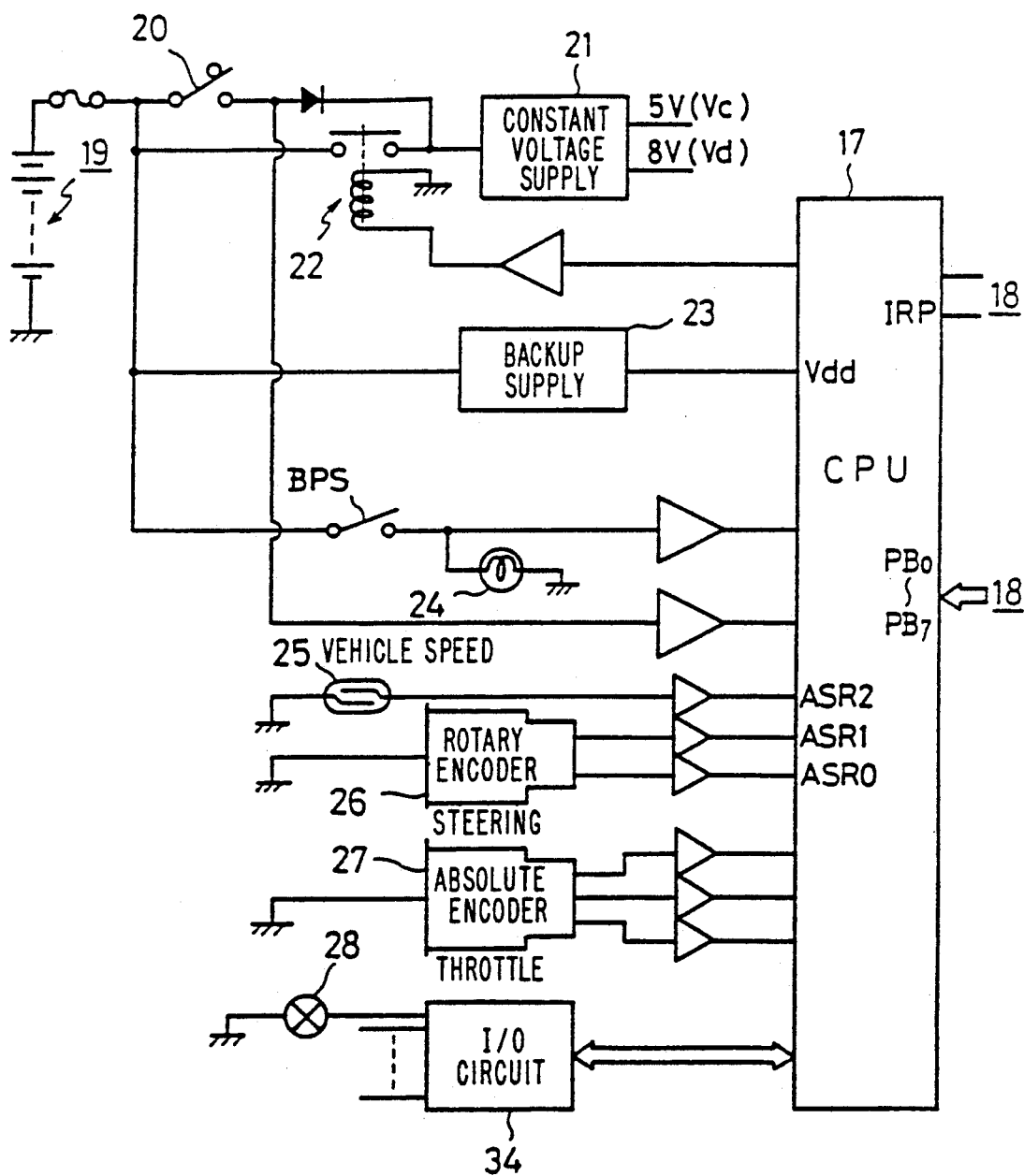
FIG. 8a and 8b are block diagrams of an electrical control system which controls a suspension pressure in response to values detected by a vehicle elevation sensor, pressure sensor or the like, of the suspension pressure feeding system shown in FIGS. 1a and 1b, both Figures being halves of a single electrical control system.
Figure 8B:
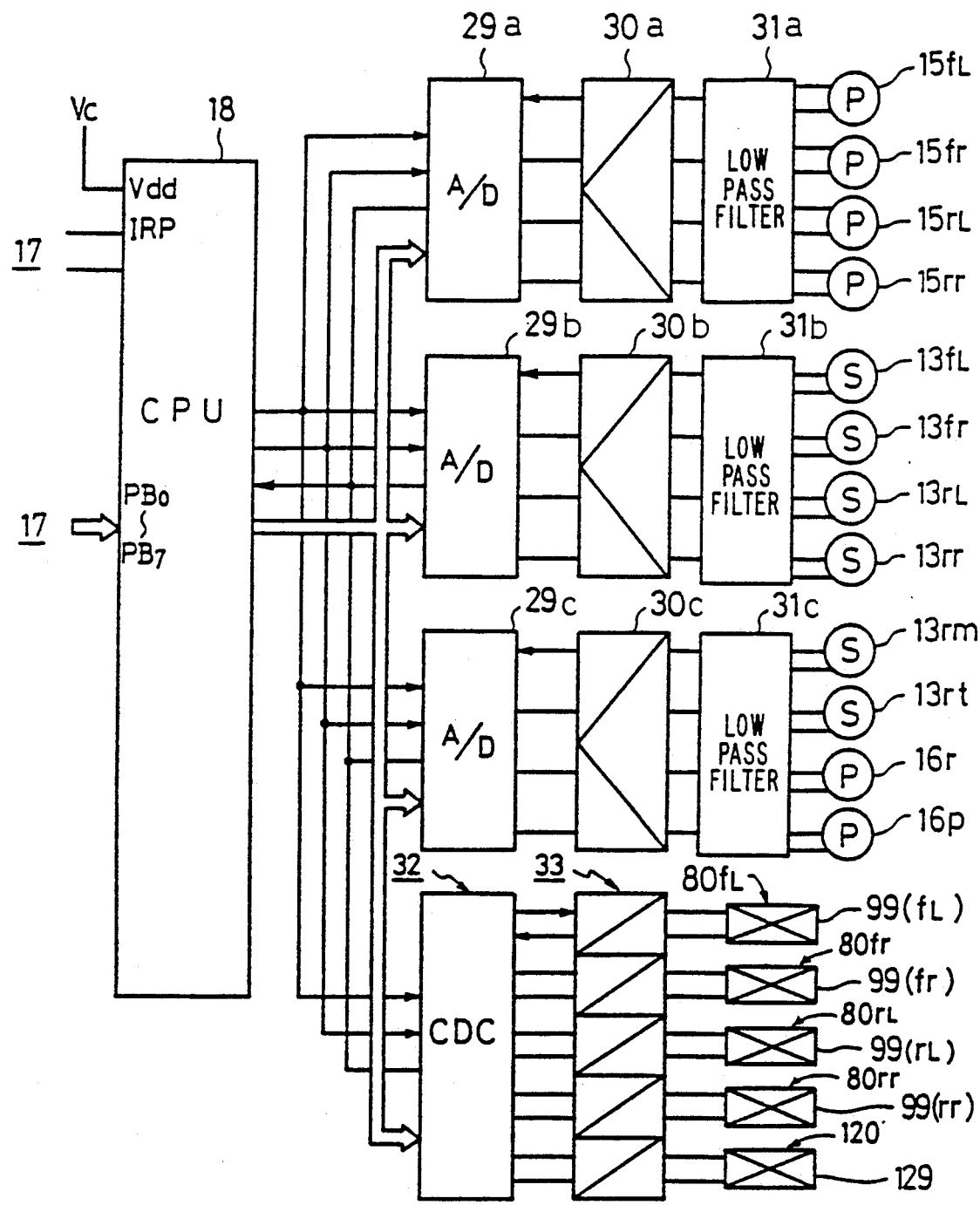

FIGS. 8a and 8b show an electrical control system which determines the driving condition and the attitude of a vehicle in response to the status of various switches and sensors mounted on the vehicle and establishes required pressures in the individual suspensions shown in FIGS. 1a and 1b so as to bring the attitude of the car body to a desired one.

Vehicle elevation sensors 15fL, 15fr, 15rL and 15rr are connected to a low pass filter 31a, which cuts off high frequency components or noises in an analog signal which is detected by the respective sensors, and smoothes a relatively high frequency component which is shaped to provide a vehicle elevation signal, which is then amplifies to reach a given range of levels by an amplifier 30a before it is applied to A/D converter (IC) 29a.

Pressure sensors 13fL, 13fr, 13rL and 13rr which detect the oil pressure of the individual suspensions are connected to a low pass filter 31b, which cuts off high frequency components or noises from an analog signal representing a pressure detected by individual pressure sensors and smoothes a relatively high frequency component, which is then shaped to provide a pressure signal, that is in turn amplified to reach a given range of levels by an amplifier 30b before it is applied to A/D converter (IC) 29b.

Pressure sensor 13rm which detects the pressure of the rear wheel high pressure feed piping 9 and pressure sensor 13rt which detects the pressure of the rear wheel side of the return path 11 are connected to a low pass filter 31c, which cuts off high frequency components or noises from an analog signal representing a pressure detected by the respective pressure sensors and smoothes a relatively high frequency component to provide a shapes pressure signal, which is then amplified to reach a given range of levels by an amplifier 30c before it is applied to A/D converter (IC) 29c.

A longitudinal acceleration sensor 16p which detects the acceleration in the fore-and-aft direction of the vehicle (a positive value representing an acceleration and a negative value representing acceleration) and a lateral acceleration sensor 16r which detects the acceleration in the lateral direction of a vehicle (a positive value representing an acceleration directed from left to right and a negative value representing an acceleration directed from right to left) are also connected to the low pass filter 31c, which cuts off high frequency components or noises from an analog signal representing a pressure detected by the respective acceleration sensor and smoothes a relatively high frequency component to provide a shaped acceleration signal, which is then amplified to reach a given range of levels by an amplifier 30c before it is applied to A/D converter (IC) 29c.

The electrical coils 99 of the pressure control valves 80fL, 80fr, 80rL and 80rr as well the electrical coil 129 of the bypass valve 120 are connected to coil drivers 33. Each driver 33 comprises a switching circuit which is operative to energize individual electrical coil, and a current detector which detects the current level of the respective coil and produce an analog signal representing same. A duty controller (IC) 32 provides an ON (energization)/OFF (deenergization) command. In response to the on command, the driver 33 completes the connection between a selected coil and the output of a constant current circuit. The OFF command causes such connection to be disconnected. Analog voltages representing the current levels detected are normally fed to A/D converter (IC) 29c.

The duty controller 32 receives data representing the current level to be used in the energization for each of the electrical coils (which are associated with the pressure control valves and the bypass valve) and which is supplied from a microprocessor (hereafter abbreviated as CPU) 18 and stores it in a latch, feeds a detected current level to CPU 18 through A/D converter (IC) 29c for feedback purpose, controls the duty cycle so as to achieve the current level specified by CPU 18, and deliver a time sequence of ON/OFF commands which corresponds to the duty cycle to the coil driver 33.

Each of A/D converters 29a to 29c is formed by an integrated circuit internally housing a sample-and-hold circuit having four input ports, except for the converter 29c which is fed with analog voltages from the coil driver 33, representing detected current levels of the pressure control valve and the bypass valve. In response to a conversion command from CPU 18, the converter samples an analog voltage at its input port in its sample-and-hold circuit and converts it to digital data which may be vehicle elevation, pressure or acceleration data, which is then transferred to CPU 18 serially in synchronism with a clock pulse fed from CPU 18. The sampling, the conversion and the transfer operation take place successively with respect to the input ports 1 to 4. In this manner, a single conversion command from CPU 18 is effective to cause the converter to sample four analog voltages at its input ports successively and to transfer resulting digital data serially to CPU 18.

CPU 18 is arranged to communicate data with CPU 17, which receives a number of signals including an open (L:no pressure control command)/close (H:command) signal from a command switch SCS which commands a pressure control of the suspension; a signal from a brake pedal having H (depressed)/L(no depression) level; an open (L)/close (H) signal from the ignition switch 20; pulses from a vehicle speed synchronized pulse generator 25 which generates one pulse per incremental angle of rotation of an output shaft of an onboard transmission; a first set and a second set of pulses from a rotary encoder 26 which produces one pulse per incremental angle of rotation of a steering shaft, the pulses in the second set being 90° phase displaced from the pulses in the first set; data generated by an absolute encoder 27 coupled to the rotary shaft of a throttle valve of the engine and producing 3-bit data representing the opening of the throttle valve; and a signal from a level sensor 28 which detects the oil level in the reservoir 2 (H:below a lower limit level, L:a level higher than the lower limit level). In addition, signals from other sensors, not shown, are fed to CPU 17 through an input/output circuit 34. An indicator such as a warning light is also connected to the input/output circuit 34, and is operated by CPU 17 through the input/output circuit 34 in the event the occurrence of any abnormality in the pressure control of the suspension is determined.

An onboard battery 19 is connected to a backup power supply circuit 23 having a reduced capacity and which feeds a constant voltage to CPU 17. Accordingly, as long as the battery 19 provides an output voltage which is at or above a given value, CPU 17 is normally maintained operative to preserve data in its internal memories.

The onboard battery 19 is also connected through the ignition switch 20 to a constant voltage power supply circuit 21 having an increased capacity, which deliver constant voltages of low level to electronic elements and circuits such as CPU 18 and also delivers constant voltages of high levels to selected circuits such as low pass filters 31a to 31c and input/output circuit 34. The ignition switch 20 is shunted by a self holding contact of a relay 22, which may be turned ON and OFF by CPU 17.

Each of CPU's 17 and 18 has respective programs stored therein which controls the pressures of the suspensions. CPU 18 operates according to such program, principally operating to read values detected by vehicle elevation sensors 15fL, 15fr, 15rL, 15rr, the pressure sensors 13fL, 13fr, 13rL, 13rr, 13rm, 13rt and the onboard longitudinal and lateral acceleration sensors 16t, 16r and to control the current level which is used to energize the electrical coils 99, 129 of the pressure control valves 80fL, 80fr, 80rr and the bypass valve 120.

By contrast, CPU 17 operates to establish or terminate the line pressure for the suspension system (FIGS. 1a and 1b), to determine the driving condition of the vehicle, and to calculate pressures required of the suspension in order to establish a vehicle elevation and vehicle attitude which are appropriate to the result of the determination during an interval from the turn-ON to the turn-OFF of the ignition switch 20 as well as during a short time internal thereafter. At this end, CPU 17 receives various detected values from CPU 18 in order to determine the driving condition of a vehicle, and delivers the current level required for the energization to establish the required pressure to CPU 18.

TABLE 1

| register | data entered | description of data entered |
| --- | --- | --- |
| PFLo | PfLo | initial pressure of shock absorber 101fL |
| PFRo | Pfro | initial pressure of shock absorber 101fr |
| PRLo | PrLo | initial pressure of shock absorber 101rL |
| PRRo | Prro | initial pressure of shock absorber 101rr |
| DPH | Dph | rear wheel pressure of high pressure line 8 |
| DPL | DpL | rear wheel pressure of return path 11 |
| SS | Ss | steering angular velocity |
| TP | Tp | throttle opening |
| St | St | period during which CPU 17 reads a detected value |
| VS | Vs | vehicle speed |
| PG | Pg | longitudinal acceleration (sensor 16t) |
| RG | Rg | lateral acceleration (sensor 16r) |
| DFL | DfL | vehicle elevation to front, left wheel |
| DFR | Dfr | vehicle elevation to front, right wheel |
| DRL | DrL | vehicle elevation to rear, left wheel |
| DRR | Drr | vehicle elevation to rear, right wheel |
| HT | Ht | heave target value |
| PT | Pt | pitching target value |
| RT | Rt | rolling target value |
| WT | Wt | warp target value |

TABLE 1-continued

| register | data entered | description of data entered |
| --- | --- | --- |
| ... | ... | ... |

Figure 9A:
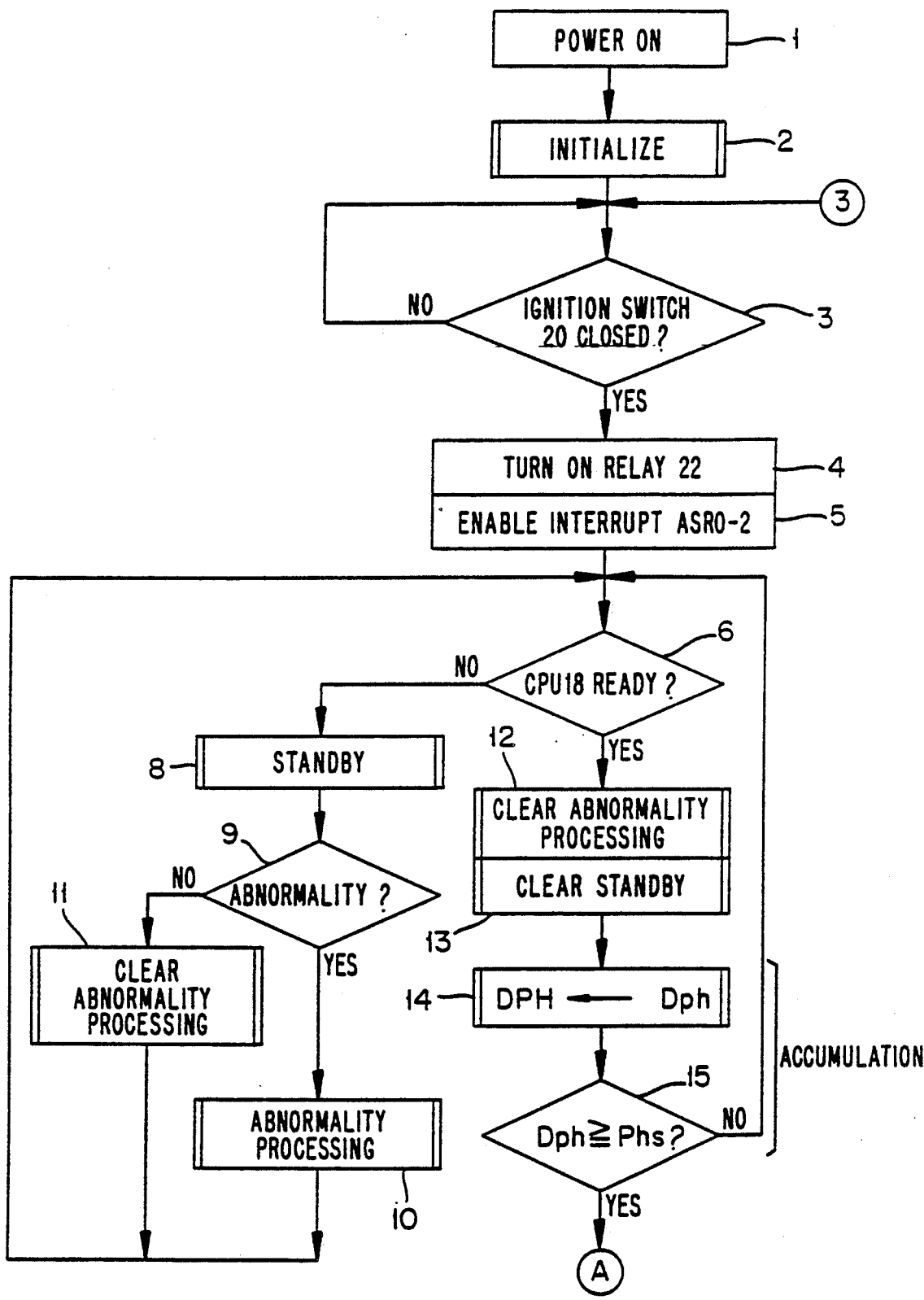

Referring to FIG. 9a and subsequent Figures, the control operation performed by CPU 17 and 18 will now be described. To facilitate the understanding, nomenclature used to designate principal registers which are assigned to internal memories in CPU 17 as well as the description of principal data which are entered in the respective registers are summarized in Table 1. It is to be understood that in the description to follow as will as in the flow charts shown in the drawings, the momenclature used to designate the register itself may also indicate the content which is stored in the register.

Initially referring to FIG. 9a, when the power supply is turned on (step 1 where the backup power supply circuit 23 is activated to produce constant voltages or the battery 19 is mounted on the vehicle), CPU 17 initializes its internal registers, counters and timers, and deliver signal levels at its output ports which establish initial standby conditions (this involves no energization of mechanical elements) (step 2). CPU 17 then examines if the ignition switch 20 is closed (step 3), and if it remains open, it waits for the switch to be closed.

When the ignition switch 20 is closed, the coil of the relay 22 is energized to close the self-holding contacts (step 4). As a result of a closure of the ignition switch 20, the power supply circuit 21 having an increased capacity is connected to the battery 19, and operates to deliver constant voltages of low level to electronic components such as CPU 18 and other electrical circuits and to deliver constant voltages of high level to low pass filters 31a to 31c and input/output circuit 34. In this manner, CPU 18 is also electrically activated to be operative. Since the relay contacts are closed to maintain the power supply circuit 21 connected to the battery 19, the electrical circuit system shown in FIGS. 8a and 8b are entirely electrically activated to remain operative if the ignition switch 20 is subsequently opened unless the relay 22 is turned OFF by CPU 17.

After energizing the relay coil, CPU 17 enables an interrupt operation which is executed in response to an oncoming pulse signal to its interrupt input ports ASR0 to ASR2 (step 5).

The interrupt operation will be initially described. Considering an interrupt operation which takes place in response to a pulse generated by the vehicle speed synchronized pulse generator 25 (applied to input port ASR2), as the generator 25 generates a single pulse, CPU 17 advances to an interrupt operation (ASR2) where the content of a vehicle speed measuring register is read and the register is re-started. A vehicle speed is calculated on the basis of the content read (representing the time period for the pulses), a weighted mean Vs is derived over previous several values of the vehicle speed calculated which have been stored and the weighted mean written into a vehicle speed register VS, and then the operation returns to the main program. As a result of the execution of the interrupt operation (ASR2), data Vs representing the prevailing vehicle speed or a value which is smoothed over previous calculated values in the time sequence is always maintained in the vehicle speed register VS.

When a first set of pulses are produced by the rotary encoder 36 which detects the direction of rotation of the steering shaft to initiate the interrupt operation (input port ASRO), the interrupt operation (ASRO) is entered in response to a rising and a falling edge of the pulses in the first set. When the interrupt operation (ASRO) is entered in response to the rising edge, "H" is written into a flag register which is used to determine the direction of the register. When the interrupt operation (ASRO) is entered in response to the falling edge, the flag register is cleared (or "L" is entered), subsequently returning to the main program.

It will be seen that if a rising edge of a pulse in the first set from the rotary encoder 26 (flag register=H), this means that the steering shaft is driven to rotate counter-clockwise. On the contrary, if the falling edge of a pulse in the first set (flag register=L) is followed by the rising edge of a pulse of the second set, the steering shaft is driven for clockwise rotation.

When an interrupt operation (input port ASR1) is entered in response to a second set of pulses generated by the rotary encoder 36 which detects the rotational speed (steering angular velocity of the steering shaft, a pulse (or its falling edge) in the second set initiates the interrupt operation (ASR1) wherein the content of a steering measuring register is read and the register restarted, a positive (counter-clockwise rotation) or a negative (clockwise rotation) sign is applied to the read content which indicates the time period of pulses generated in synchronism with the steering angular velocity when the content of the flag register is "H" or "L", respectively, and a speed value inclusive of the direction sign is calculated therefrom, a weighted means Ss over previous several values calculated is derived and written into a steering angular velocity register Ss, and then the operation returns to the main program. As a result of the execution of the interrupt operation (ASR1), data Ss (where a positive value represents a counter-clockwise rotation while a negative value indicates a clockwise rotation) representing the prevailing steering angular velocity register SS.

When CPU 17 has enabled the interrupt operation, it examines if CPU 18 issues a ready signal (step 6). When the power supply to CPU 18 is turned ON as when the ignition switch 20 is closed or the power supply circuit 21 delivers an output of Vc=5 V, CPU 18 initializes its internal registers, counters and timers, and delivers at its output ports signal levels for establishing initial standby conditions which involves no electrical energization of mechanical elements. Data are supplied to the duty controller which designate all of the electrical coils to be turned off. CPU 18 then delivers a maximum current level data which causes the full closure of the bypass valve 120, and then commands the energization of the bypass valve 120. As a result of above arrangement, the current level for all of the pressure control valves 80fL, 80fr, 80rL and 80rr are equal to zero, and a pressure equivalent to that prevailing in the return path 11 is delivered to its output port (84). Since the bypass valve 120 is in full closure and since the ignition switch 20 is closed and the pump 1 is being drive for rotation, the pressure in the high pressure feed piping 8, the front wheel high pressure feed piping 6 (accumulator 7) and the rear wheel high pressure feed piping 9 (accumulator 10) begins to rise. Subsequently, during a first period, CPU 18 reads values detected by vehicle elevation sensors 15fL, 15fr, 15rL, 15rr, the pressure sensors 13fL, 13fr, 13rL, 13rr, 13rm, 13rt, longitudinal acceleration sensor 16p and lateral acceleration sensor 16r as well as the current levels detected from the coil drivers 33, all of which are used to update its internal registers. When CPU 17 delivers data representing the current levels of the pressure control valves 80fL, 80fr, 80rL, 80rr and the bypass valve 120, CPU 18 transfers it to the duty controller 32.

If CPU 17 finds at step 6 that CPU 18 delivers a busy signal, it loops around stnsby loop (steps 8 to 11). If CPU 18 delivers a ready signal, the standby looping is terminated (step 13).

CPU 17 requests CPU 18 to transfer detected pressure data Dph from the pressure sensor 13rm, and then receives it and writes it into register DPH (step 14), and then examines if the detected pressure Dph representing the rear wheel side pressure of the high pressure feed piping 8 has become equal to or greater than a given value Pph, which is less than a given low pressure at which the cut valves 70fL, 70fr, 70rL, 70rr begin to be opened or if the line pressure has risen to a degree (step 15). If the line pressure has not risen, the operation returns to step 6.

Figure 9B:
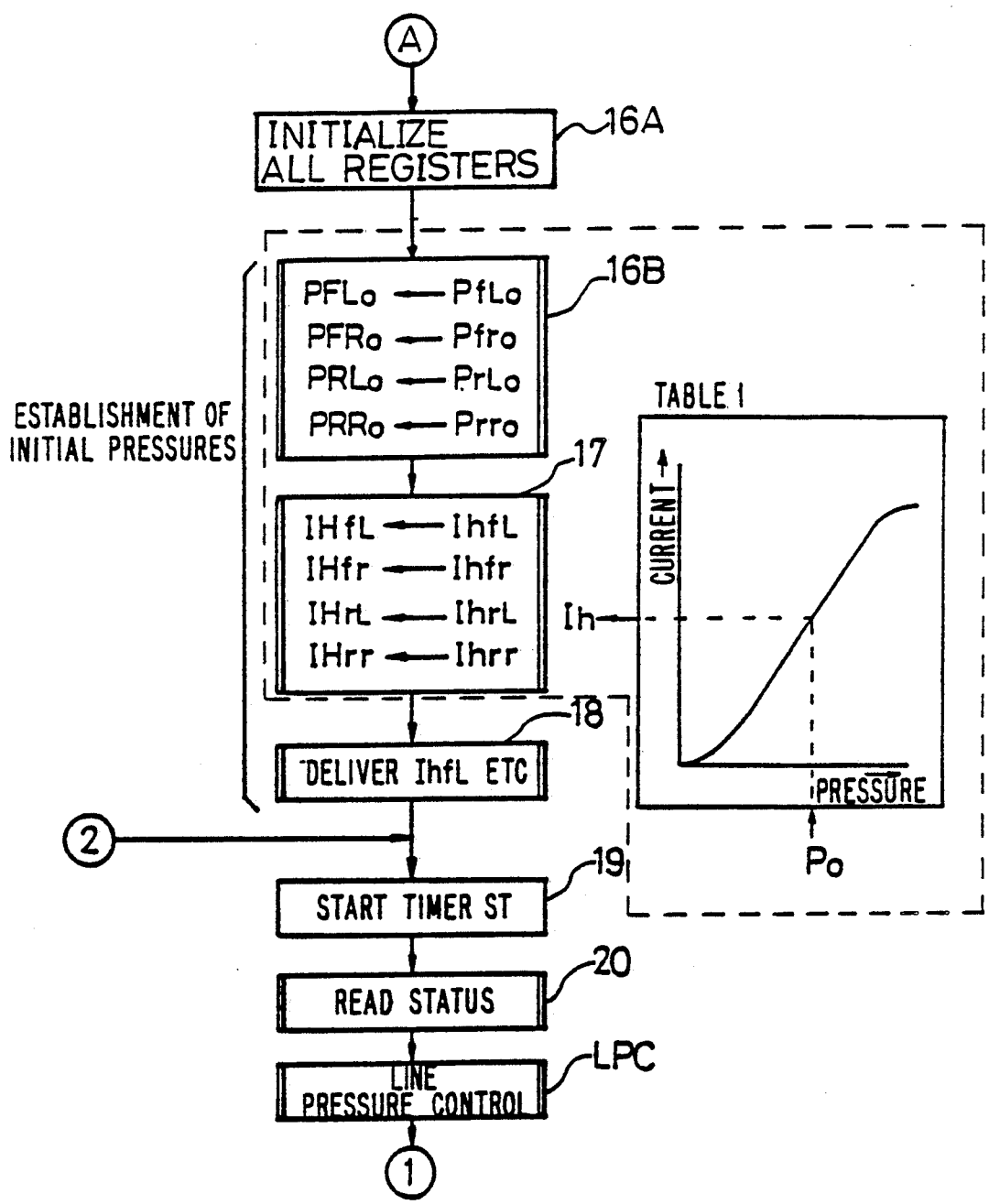

Referring to FIG. 9b, when the line pressure has risen (up to Phs), CPU 17 clears all of the registers as shown in the Table 1 (step 16A) and commands CPU 18 to transfer data PfLo, Pfro, PrLo, Prro representing the initial pressures detected by the pressure sensors 13fL, 13fr, 13rL, 13rr, which are then written into registers PFLo, PFRo, PRLo, PRRo upon receipt (step 16B).

The content PfLo, Pfro, PrLo, Prro of the registers PFLo, PFRo, PRLo, PRRo are used to access data representing the current level which is required to achieve a required pressures and which are stored in a given region (Table 1) of the internal ROM, thus the reading from the Table 1 the current level IhfL which is required to the coil 99 to deliver the pressure PfLo to the output port 84 of the pressure control valve 80fL; the current level Ihfr which is required to deliver the pressure Pfro to the output port of the pressure control valve 80fr; the current level IhrL required to deliver the pressure PrLo to the output port of the pressure control valve 80rL and the current level Ihrr required to deliver the pressure Prro to the output port of the pressure control valve 80rr, all of which are written into output registers IHfL, IHfr, IHrL and IHrr (step 17). Data in these output registers are transferred to CPU 18, which delivers them to the duty controller 32 upon receipt.

The duty controller 32 stores data representing the current levels IhfL, Ihfr, IhrL and Ihrr in respective latches and then regulates the ON/OFF duty of the coil 99 associated with the pressure control valve 80fL so that the current level which is fed back from the pressure control valve 80fL through CPU 18 becomes equal to IhfL. A time sequence of ON/OFF commands which corresponds to such duty is applied to the coil driver 33 so as to control the pressure control valve 80fL. The duty control of the remaining pressure control valves 80fr, 80eL, 80rr takes place in a similar manner, applying a time sequence of ON/OFF commands to the coil driver 33. When the current levels are established in this manner, the pressure control valves 80fL, 80fr, 80rL 80rr deliver the pressures which are substantially equal to PfLo, Pfro, PrLo, Prro, to the output port (84) if the line pressure is equal to or greater than a given low pressure. When the cut valves 70fL, 70fr, 70rL, 70rr are opened in response to the line pressure rising to or above the given low pressure, pressures which are substantially equal to the initial pressure PfLo, Pfro, PrLo, Prro of the individual suspensions are supplied through the cut valves 70fL, 70fr, 70rL, 70rr and the pressure control valves 80fL, 80fr, 80rL 80rr to the suspensions 100fL, 100fr, 100rL, 100rr, respectively. Accordingly, when the ignition switch 20 changes from its open (the engine and the pump 1 not operating) to its closed (the pump 1 being driven) condition and the cut valves 70fL, 70fr, 70rL, 70rr are open to achieve the line pressure which is equal to or greater than the given low pressure and the oil pressure lines of the suspension communicate with the output ports of the pressure control valve, the pressures delivered by the pressure control valves will be substantially equal to the suspension pressures, preventing a rapid pressure variation in the suspensions. In other words, an impulse-like change in the attitude of the vehicle is avoided. The above description covers the establishment of initial output pressures from the pressure control valves 80fL, 80fr, 80rL, 80rr when the ignition switch 20 is changed from its open to its closed condition or immediately after the engine has started.

Subsequently, CPU 17 starts timer ST which provides a time limit ST (step 19). The content of the register ST is represented by ST, and data ST representing a second time period which is longer than the first time period during which CPU 18 reads detected values is written into the register ST.

Upon starting the timer ST, CPU 17 reads the status (step 20). Specifically, the open/close signal of switch BTS which detects the depression of the brake pedal, data representing the throttle opening from the absolute encoder 27, and a signal from the reservoir level detecting switch 28 are read and written into internal registers. At the same time, CPU 17 commands CPU 18 to transfer detected data, whereby data DfL, Dfr, DrL, Drr representing the vehicle elevations detected by the sensors 15fL, 15fr, 15rL, 15rr, data PfL, Pfr, PrL, Prr, Prm, Prt representing the pressures detected by the sensors 13fL, 13fr, 13rL, 13rr, 13rm, 13rt, and data representing the detected current level of the pressure control valves 80fL, 80fr, 80rL, 80rr and the bypass valve 120 are transferred to CPU 17, which then write them into internal registers. A reference to these read value is made to render a decision concerning the abnormality/normality, and in the event an abnormality is found, the program proceeds to step 8.

In the event a normality is found, CPU 17 then executes a line pressure control (LPC). Specifically, it derives the absolute value and the polarity (high/low) of a deviation of a detected line pressure Prm with respect to a reference pressure which is a fixed value slightly less than a relief pressure (which is referred to as a given high pressure) of the relief valve 60m, and adds a correction value which reduces the deviation to zero to the current level that is currently fed to the bypass valve 120 to derive a new current level for the bypass valve 120, which is then written into an output register. The content of this output register is transferred to CPU 18 at a subsequent step 36. As a result of this line pressure control (LPC), the current level of the bypass valve 120 will be controlled so that the pressure of the rear wheel high pressure feed piping 9 assumes a given value slightly less than the relief pressure (the given high pressure) of the relief valve 60m.

Figure 9C:
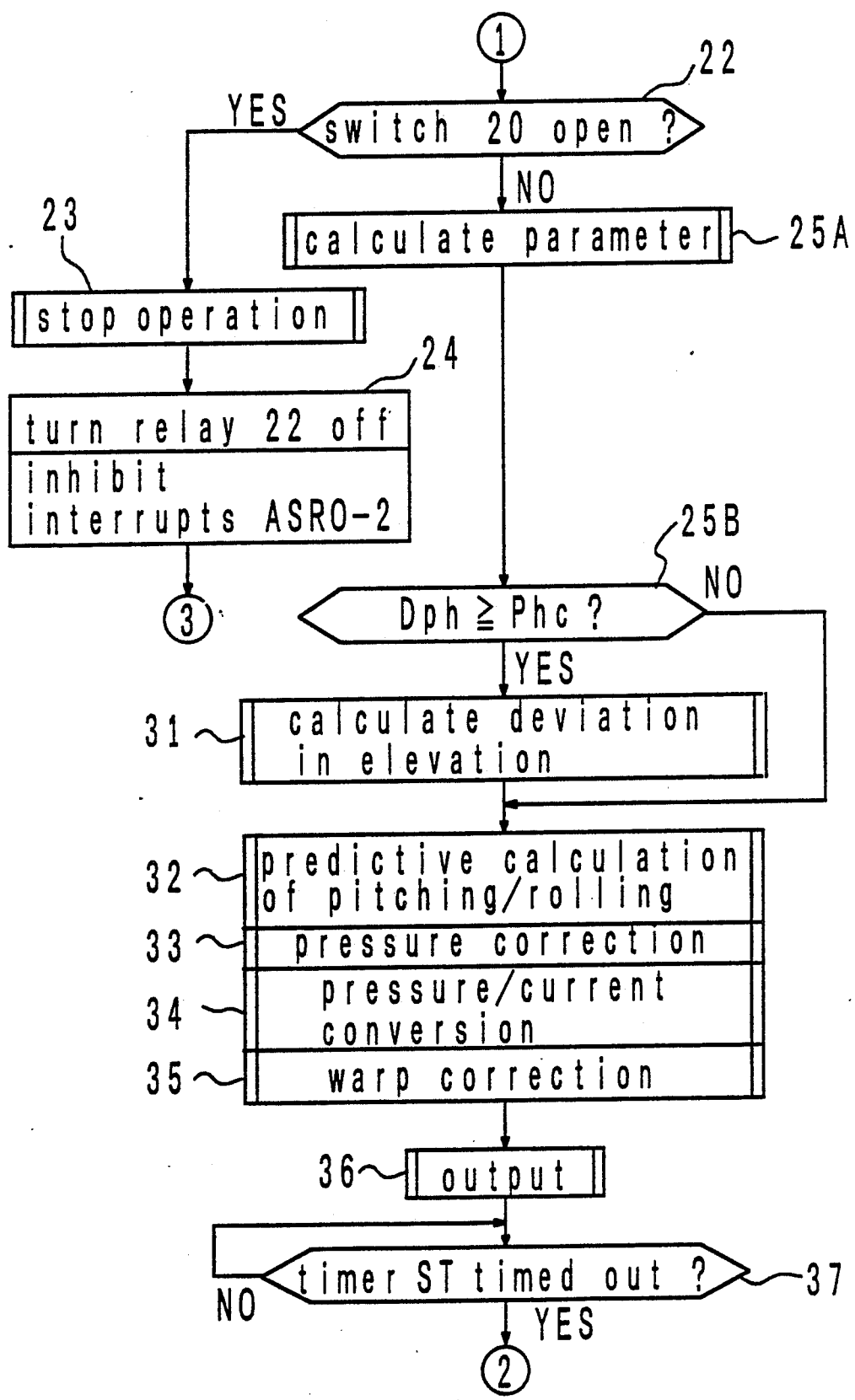

Referring to FIG. 9c, upon completion of the line pressure control (LPC) CPU 17 examines the switch 20 to see if it is open or closed (step 22), and if it is open, it executes a stop operation (step 23) where the relay 22 is deenergized and the interrupt operations (ASR0 to ASR2) are inhibited. In the stop operation (step 23), the bypass valve 120 is initially deenergized so that it becomes fully open, thus releasing the line pressure to the return path 11. When the switch 20 is open and hence the engine as well as the pump 1 cease to operate, and the discharge of a high pressure from the pump 1 ceases, the bypass valve 120 which is now fully open allows the pressures in the high pressure feed piping 8, the front wheel high pressure feed piping 6 (accumulator 7) and the rear wheel high pressure feed piping 9 (accumulator 10) to be reduced to the pressure of the return path 11, which is in turn released to the reservoir 2. Thus all of the pipings assume an atomospheric pressure. At a timing when all of the pipings reduces to or below the given low pressure at which the cut valves 70fL, 70fr, 70rL, 70rr are fully closed, CPU 17 operates to deenergize the pressure control valves 80fL, 80fr, 80rL, 80rr.

When the switch 20 is closed, CPU 17 calculates a parameter representing the running condition of the vehicle (step 25A) and then examines if the detected pressure Dph representing the rear wheel side pressure of the high pressure feed piping 8 has become equal to or greater than a given value Phc, which is over a given high pressure at which the cut valves 70fL, 70fr, 70rL, 70rr are fully open (step 25B). If the line pressure has not risen, the operation skips a next step 31 "calculation of vehicle elevation deviation".

When the pressure Dph is equal to or greater than a given value Phc, CPU 17 executes "calculation of vehicle elevation deviation" (step 31) where a deviation of the actual vehicle elevation with respect to a target elevation is calculated, and a correction to be applied to the suspension pressures, hereafter referred to as a first correction for each of the suspensions, is calculated which reduces the deviation to zero. The detail of this operation will be described later in connection with FIGS. 10a and 10b.

"Calculation of vehicle elevation deviation" (step 31) is followed by "predictive calculation of pitching/rolling" (step 32) where a correction to the suspension pressure (which is hereafter referred to a second correction for each of the suspensions), is calculated in accordance with longitudinal and lateral accelerations which the vehicle actually experiences, the deriving an interim value "initial suspension pressure (PfLo, Pfro, PrLo, Prro) + first correction + second correction". The detail of this operation will be described later in connection with FIGS. 10c and 10d.

CPU 17 then executes "pressure correction" (step 33) where the "interim value" mentioned above is again corrected in accordance with the line pressure (high pressure) detected by the pressure sensor 13rm and the return pressure (low pressure) detected by the pressure sensor 13rt. The detail of this operation will be described later in connection with FIG. 10e.

CPU 17 then effects "pressure/current conversion" (step 34) where the corrected "interim value" for each of the suspensions is converted into the current level which is to be used in energizing the pressure control valves (80fL, 80fr, 80rL, 80rr). The detail of this operation will be described later in connection with FIG. 10f.

CPU 17 then effects "correction of warp" (step 35) where a turning warp correction, representing a correction to be applied to the current level, which depends on the lateral acceleration Rg and the steering rate Ss, is calculated and is added to the current level to be applied to the pressure control valve. The detail of this operation will be described later in connection with FIG. 10g.

CPU 17 then comes to "output" (step 36) where it delivers the current levels to be applied to the respective pressure control valves which are calculated in the manner mentioned above to CPU 18 so as to be fed to the individual pressure control valves, and also deliver the current level which is to be applied to the bypass valve 120 as calculated by the "line pressure control" (LPC) to CPU 18 so as to be fed to the bypass valve 120.

At this point, CPU 17 has completed all the tasks which are contained in one cycle of the suspension pressure control. CPU 17 then waits for the timer ST to time out (step 37), whereupon it returns to step 19, re-starting the timer ST and initiating the execution of tasks in the suspension pressure control of next cycle.

In controlling the suspension pressures as described above, CPU 17 demands CPU 18 to effect a transfer of detected values from the sensors with ST period (second period) (subroutine 20). In response thereto, CPU 18 transfers sensor data to CPU 17, which is a smoothed version of a weighted mean of several past values which are read during the first period. Data representing the current levels which are to be applied to the respective pressure control valves and the bypass valves 120 are transferred form CPU 17 to CPU 18 with the ST period. In response to each transfer, CPU 18 deliver such current level data to the duty controller 32, where they are latched. Accordingly, the duty controller 32 controls the duty cycle of the energization so that the actual current levels of the pressure control valves and the bypass valve 120 as detected by the coil drivers 33, coincide with the target current levels while updating the target current levels themselves with the ST period.

Figure 10A:
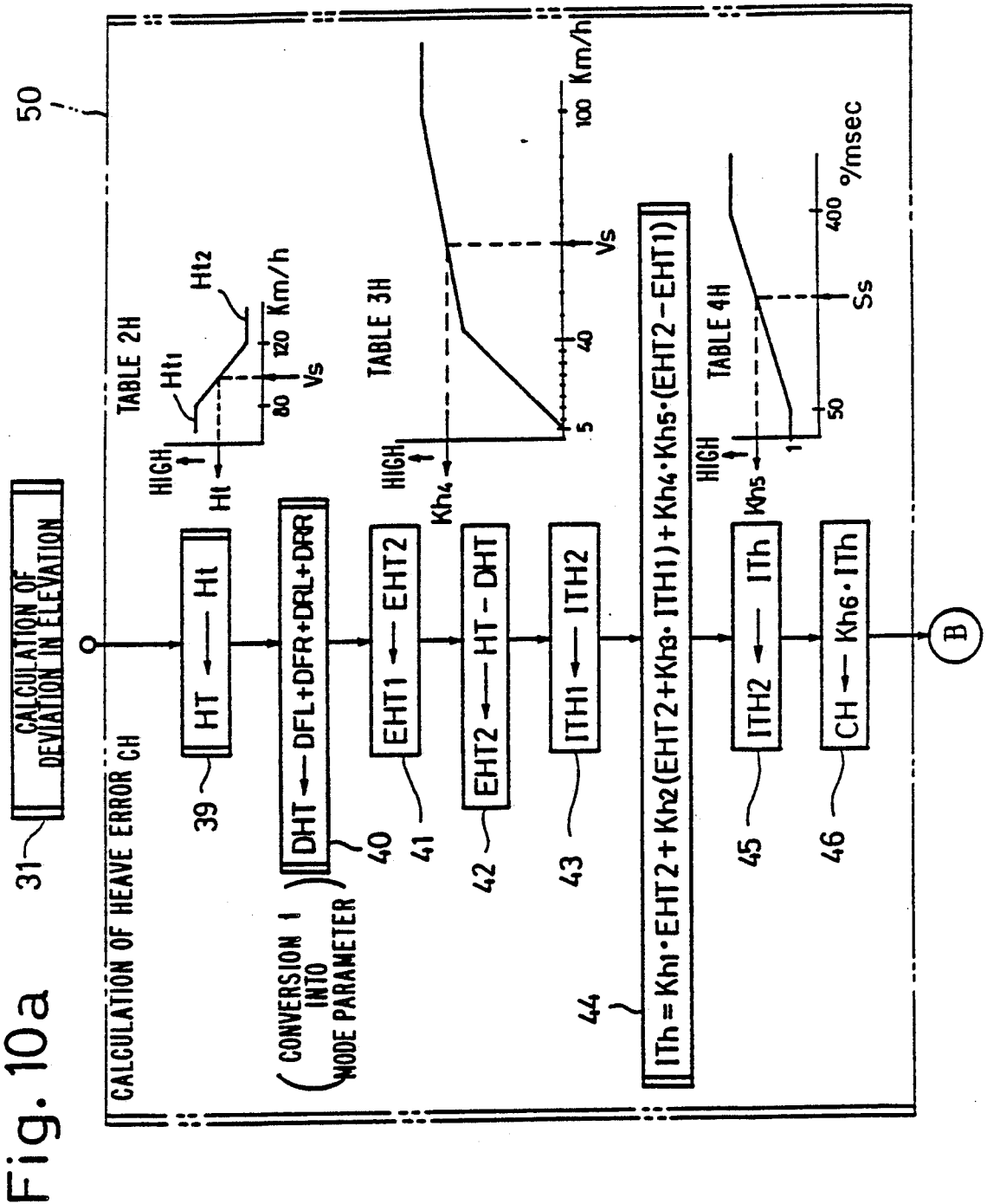
Figure 10B:
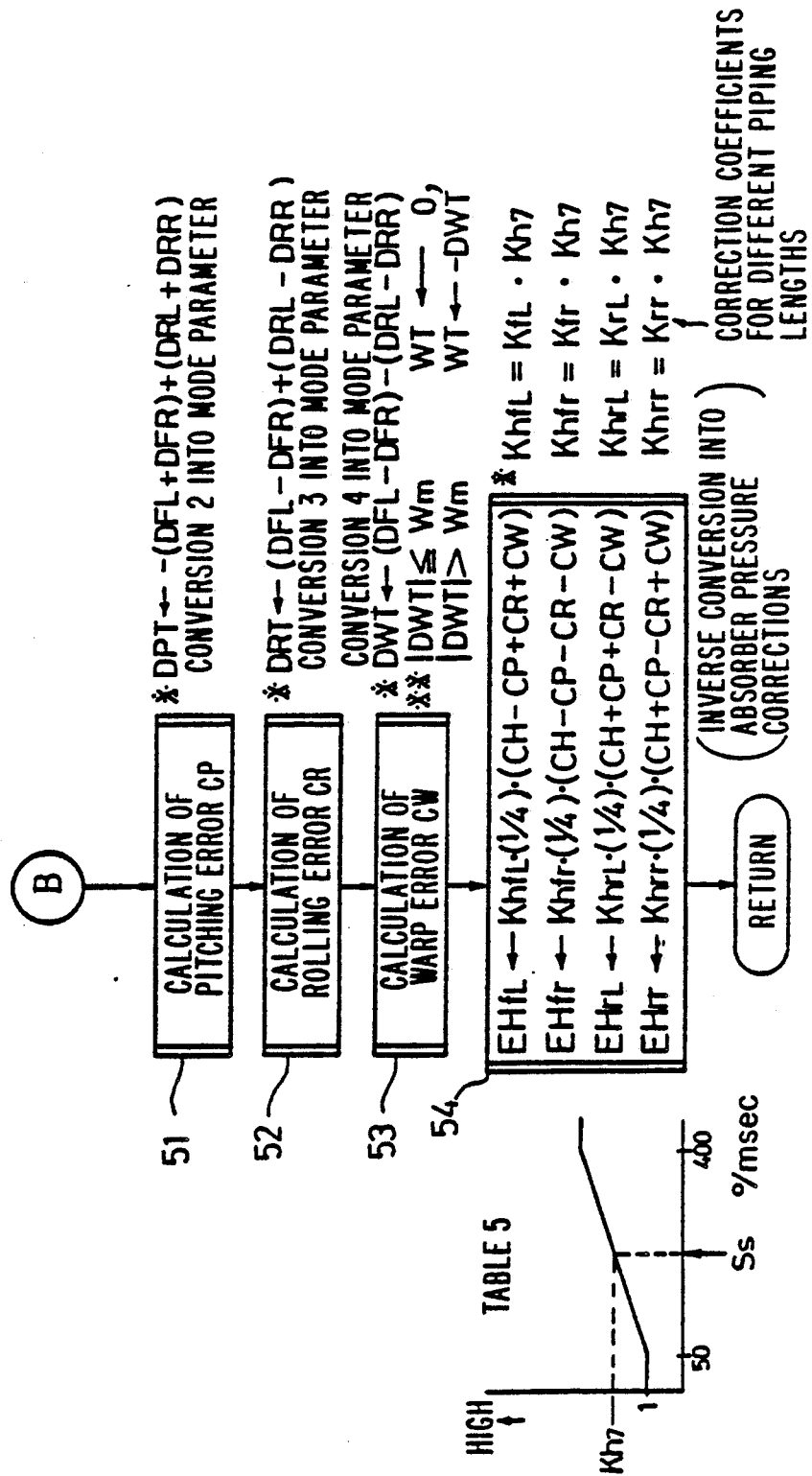

Referring to FIGS. 10a and 10b, "calculation of vehicle elevation deviation" as represented by step 31 will be described. To give a general summary initially, data DfL, Dfr, DrL, Drr, which are contents of the registers DFL, DFR, DRL, DRR, representing vehicle elevations detected by the sensors 15fL, 15fr, 15rL, 15rr are used to determine an overall vehicle heave (height) DHT, pitch DPT representing a difference in the vehicle elevation between the front wheel and the rear wheel, a roll DRT representing a difference in the vehicle elevation between the right wheel and the left wheel, a warp DWT representing a difference between the sum of the vehicle elevations of the front, right wheel and the rear, left wheel and the sum of the vehicle elevations of the front, left wheel and the rear, right wheel. Specifically, the vehicle elevations of the respective wheels as represented by the content of the registers DFL, DFR, DRL, DRR are converted into a heave DHT, a pitch DPT, a roll DRT, a warp DWT, which are attitude parameters of the overall vehicle.

$$DHT = DFL + DFR + DRL + DRR$$
$$DPT = -(DFL + DFR) + (DRL + DRR)$$
$$DRT = (DFL - DFR) + (DRL - DRR)$$
$$DWT = (DFL - DFR) - (DRL - DRR)$$

The calculation of the parameter DHT is executed in "calculation of heave error CH" (subroutine 50), the calculation of the parameter DPT is executed in "calculation of pitching error CP" (subroutine 51), the calculation of the parameter DRT is executed in "calculation of rolling error CR" (subroutine 52), and the calculation of the parameter DWT is executed in "calculation of warp error CW" (subroutine 53).

In the "calculation of heave error CH" (subroutine 50), a target heave Ht s derived from the vehicle speed Vs, and a heave error of the calculated heave DHT with respect to the target heave Ht is calculated. For purpose of PID (proportional, integral and differential) control, the calculated heave error is passed through PID processing, which derives a heave correction CH corresponding to the particular heave error.

Similarly, in the "calculation of the pitching error CR" (subroutine 51), a target pitch Pt is derived from the longitudinal acceleration Pg, and the pitch error of the calculated pitch DPT with respect to the target pitch Pt is calculated, and the calculated pitch error is subject to PID processing, thus deriving a pitch correction CP which depends on the particular pitch error.

Also, in the "calculation of rolling error CR" (subroutine 52), a target roll Rt is derived from the lateral acceleration Rg, and a roll error-of the calculated roll DRT with respect to the target roll Rt is calculated, which is then subjects to PID processing, thus deriving a roll correction CR which depends on the particular roll error.

Finally, in the "calculation of warp error CW" (subroutine 53), a target warp Wt is initially assumed to be zero, and the warp error of the calculated warp DWT with respect to the target warp Wt is calculated, and is then subject to PID processing, thus deriving a warp correction CW which depends on the particular warp error. When the calculated warp error, which is equivalent to DWT since the target warp is assumed to be zero, has an absolute value which is less than a given value representing a permissible range, the warp error which is subject to PID processing is made equal to zero. When the error exceeds the given value, the warp error which is subject to PID processing is changed to −DWT.

Describing the "calculation of the heave error CH" (subroutine 50) in detail, CPU 17 initially reads a target heave Ht corresponding to the vehicle speed Vs from a region (table 2H) of the internal ROM and writes it into a heave target register Ht (step 39).

As indicated by "table 2H" in FIG. 10a, the target heave Ht which is given in correspondence to the vehicle speed Vs assumes a high value Ht1 at low vehicle speed Vs equal to or less than 80 Km/h, and a low value Ht2 for high vehicle speed Vs equal to or greater than 120 Km/h, the target changes linearly with respect to the vehicle speed Vs, although it may follow a curve. The purpose of linearly changing the target is to prevent a degradation in the stability of the vehicle elevation as a result of a frequent change of the vehicle speed at high speeds, which would be experienced if Vs is around 100 Km/h, as a result of a stepwise variation in the target heave in response to a slight change in Vs when a target value of Ht1 is used for Vs equal to or less than 100 Km/h, while a target value Ht2 is used for Vs which is equal to or above 100 Km/h. As utilizing the setting as shown in the table 2H, any slight change in the vehicle speed Vs will only result in a slight change in the target value, thus enhancing the stability of the vehicle elevation.

CPU 17 then calculates the heave DHT (step 40). The content of the register EHT2 in which the previously calculated heave error is written is then rewritten into register EHT1 (step 41), and the heave error of the present pass HT-DHT is calculated, and is written into register EHT2 (step 42). As a consequence, the register EHT1 stores the heave error of the previous pass while the register EHT2 stores the current heave error. CPU 17 then writes the content of register ITH2 in which an error integral up to the previous pass is stored into register ITH1 (step 43), and the current PID correction ITh is calculated as follows:

$$ITh = Kh1 \cdot EHT2 + Kh2 \cdot (EHT2 + Kh3 \cdot ITH1) + Kh4 \cdot Kh5 \cdot (EHT2 - EHT1)$$

where $Kh1 \cdot EHT2$ represents the proportional term in the PID calculation, $Kh1$ represents a factor of proportionality and $EHT2$ represents the content of register $EHT2$ or the current heave error. $Kh2 \cdot (EHT2 + Kh3 \cdot ITH1)$ represents I (integral) term, $Kh2$ represents an integrating coefficient, and $ITH1$ represents a correction integral up to the previous pass or an integral of a correction output since the steps 16 to 18 where the initial pressure is established. $Kh3$ represents a weighting coefficient which relates the current error $EHT2$ and the correction integral $ITH1$ together. $Kh4 \cdot Kh5 \cdot (EHT2 - EHT1)$ represents a D (differential) term having a coefficient $Kh4 \cdot Kh5$, where $Kh4$ has a value corresponding to the vehicle speed $Vs$ and $Kh5$ has a value corresponding to the steering angular velocity $Ss$. Thus, a vehicle speed correcting coefficient $Kh4$ which corresponds to the prevailing vehicle speed $Vs$ is read from a region (table 3H) of the internal ROM, and a steering angular velocity correcting coefficient $Kh5$ which corresponds to the prevailing steering angular velocity $Vs$ is read from a region (table 4H) of the internal ROM, deriving their products $Kh4 \cdot Kh5$ as the coefficient for the differential term.

As illustrated by "table 3H" in FIG. 10a, the vehicle speed correcting coefficient $Kh4$ may be regarded as assuming a higher value for a higher vehicle speed $Vs$, thus increasing the significance of the differential term. It will be seen that the differential term provides a correction which is effective to converge as rapidly to a target value as possible in response to a change in the heave. This would be accomplished by increasing the value of the coefficient in proportion to the vehicle speed inasmuch as a change in the vehicle elevation occurs rapidly in response to disturbances when the vehicle speed is higher. On the other hand, when the vehicle speed $Vs$ exceeds a certain value which is chosen to be 40 Km/h in the table 3H, it will be seen that a depression and release of a brake pedal, an operation of an accelerator pedal, a turning of a steering wheel to effect a turning or a turn-back operation, if allowed to occur rapidly, will result in a rapid and excessive change in the attitude of the car body. Accordingly, any different term which provides a rapid compensation for such a rapid change in the attitude will degrade the stability of controlling the vehicle elevation. For this reason, the vehicle speed correcting coefficient $Kh4$ in the table 3H is designed to allow a greater change for a low vehicle speed $Vs$ and to allow a smaller change for a higher vehicle speed $Vs$. In this manner, the significance of the differential term changes greatly in response to a change in the vehicle speed when the vehicle $Vs$ is low, but a change which occurs in the significance of the differential term in response to a change in the vehicle speed will be reduces when the vehicle speed $Vs$ is high.

As shown at "table 4H" in FIG. 10a, the steering angular velocity correcting coefficient $Kh5$ can be summarized as exhibiting a greater value for a higher steering angular velocity $Ss$, thus increasing the significance of the differential term. This means that the differential term provides a correction which is designed so that a convergence toward the target value takes place rapidly in response to a change in the heave, and since the rate of change in the vehicle elevation in response to disturbances increases as the steering angular velocity $Ss$ is higher, the differential term is designed to be enhanced in accordance with the steering angular velocity. On the other hand, for a steering angular velocity $Ss$ equal to or less than a certain value, which is chosen to be 50°/msec in the table 4H, a change in the travelling direction takes place very slowly, and accordingly the significance of the differential term is chosen small. For a velocity in excess of 50°/msec and not exceeding 400°/msec, a change in the vehicle elevation takes place at a rate which is substantially proportional to the steering angular velocity $Ss$. At or above an angular velocity of 400°/msec, a change in the attitude of a vehicle will occur very rapidly and excessively, and any differential term which provides a rapid and excessive compensation for such rapid change in the attitude will degrade the stability of controlling the vehicle elevation. For this reason, the coefficient $Kh5$ for the differential term is chosen to be a constant value for $Ss$ equal to or less than 50°/msec, and is made relatively high in substantial proportion to $Ss$ when the latter exceeds 50°/msec until 400°/msec is reached, and again assumes a constant value at or above 400°/msec.

The introduction of the differential term $Kh4 \cdot Kh5 \cdot (EHT2 - EHT1)$ and the choice of the coefficient $Kh4$ which increases with the vehicle speed $Vs$ and of the coefficient $Kh5$ which increases with the steering angular velocity $Ss$ achive a differential control over the weighting in accordance with the vehicle speed $Vs$ and the steering angular velocity $Ss$ to accomplish a high stability control over the vehicle elevation in response to a change in the vehicle speed $Vs$ and the steering angular velocity $Ss$.

When the heave error correction ITh is calculated in a PID calculation subroutine (step 44), CPU 17 then writes the calculated heave error correction ITh into register ITH2 (step 45), and multiplies it by a weighting coefficient $Kh6$, representing a weighting relative to a pitch error correction, a roll error correction, and a warp error correction, which will be described later, or stated differently, a specific contribution in the total correction, and writes the result into heave error register CH.

After the execution of the subroutine 50 to calculate the heave error CH, CPU 17 executes the subroutine 51 to calculate the pitching error CP. The pitch error correction CP is calculated in the similar manner as the calculation of the heave error CH, and CPU 17 writes it into pitch error register CP. A pitch target value PT which corresponds to a heave target value HT is obtained by reading data Pt, representing a target value depending on the longitudinal acceleration Pg, from one region (table 2P) of the internal ROM.

Figure 11A:
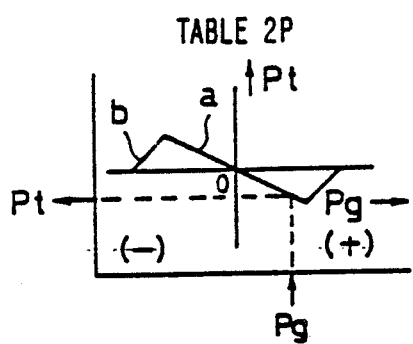

FIG. 11a shows the content of the table 2P. The pitch target value Pt acts to cancel the pitch which would appear as a result of the longitudinal acceleration Pg. The purpose of a region a is to increase the target pitch as the longitudinal acceleration Pg increases, thereby achieving a power saving. The purpose of a region b to prevent any abnormality of the sensor in response to an abnormal value of Pg from providing a pitch target value even though there is no Pg developed in actuality, by reducing the pitch target value. In other respects, the operation which occurs in this subroutine is similar to the subroutine 50 to calculate the heave error CH. Specifically, HT, Ht in step 39 may be replaced by PT, Pt; the equation to calculate DHT at step 40 may be replaced by the foregoing equation to calculate DPT; EHT1, EHT2 appearing in step 41 may be replaced by EPT1, EPT2; EHT2, HT, DHT appearing in step 42 may be replaced by EPT2, PT, DPT; ITH1, ITH2 appearing in step 43 may be replaced by ITP1, ITP2; the equation to calculate ITh in the subroutine 44 may be replaced by a corresponding equation to calculate the pitch error correction ITp; table 3H may be replaced by a coefficient table (4P) which is used to calculate the pitch correction ITp; ITH2, ITh appearing in step 45 may be replaced by ITP2, ITp; and CH, Kh6, ITh appearing in step 46 may be replaced by CP, Kp6, ITp. In this manner, a flow chart showing the subroutine 51 to calculate the pitch error CP in detail can be obtained. CPU 17 executes the processing operation represented by such flow chart.

Then CPU 17 executes the subroutine 52 to calculate the rolling error CR, and the rolling correction CR is calculated in the similar manner as the heave error CH, and is then written into rolling error register CR. In this instance, a roll target value RT corresponding to the heave target value HT may be obtained by reading data Rt which corresponds to the lateral acceleration Rg from one region (Table 2R) of the internal ROM.

Figure 11B:
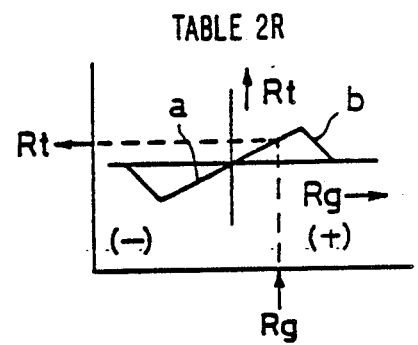

FIG. 11b shows the content of the table 2R. The roll target value Rt which corresponds to the lateral acceleration Rg acts in a direction to cancel the roll which would be developed as a result of the lateral acceleration Rg. The purpose of a region a is to increase the target roll as the lateral acceleration Rg increases, thereby achieving a power saving. The purpose of a region b is to prevent any abnormality of a sensor which responds to an abnormal value of Rg from providing a roll target value even though no Rg is developed in actuality, by reducing the roll target value. In other respects, the operation in this subroutine is similar to the subroutine 50 to calculate the heave error CH mentioned above.

Specifically, HT, Ht at step 39 may be replaced by RT, Rt; the equation to calculate DHT appearing in step 40 may be replaced by a foregoing equation to calculate DRT; EHT1, EHT2 in step 42 may be replaced by ERT1, ERT2; EHT2, HT, DHT in step 42 may be replaced by ERT2, RT, DRT; ITH1, ITH2 in step 43 may be replaced by ITR1, ITR2; the equation to calculate ITh in the subroutine 44 may be replaced by a corresponding equation to calculate a roll error correction ITr; the table 3H may be replaced by a coefficient table (3R) which is used to calculate the roll correction ITr; the table 4H may be replaced by a coefficient table (4R) which is used to calculate the roll correction ITr; ITH2, ITh appearing in step 46 may be replaced by CR, Kr6, ITr. In this manner, a flow chart indicating the subroutine 51 to calculate the roll error CR in detail may be obtained, and is executed by CPU 17.

CPU 17 then executes the subroutine 53 to calculate the warp error CW. The warp error correction CW is calculated in the similar manner as the heave error CH is calculated, and is then written into warp error register CW. A warp target value Wt corresponding to the heave target value Ht is chosen to be equal to zero. In other respects, the operation in this subroutine is similar to the subroutine 50 to calculate the heave error CH mentioned above. Specifically, HT, Ht in step 39 may be replaced by ET, O; the equation to calculate DHT at step 40 may be replaced by the foregoing equation to calculate DWT; EHT1, EHT2 at step 41 may be replaced by EWT1, EWT2; the content of step 42 is modified to a content which specifies WT to be 0 when the absolute value of DWT is equal to or below a given value Wm or a permissible range, specifies WT to be $-TWT$ when Wm is exceeded and writes WT into register TWT2; ITH1, ITH2 at step 43 may be replaced by ITW1, ITW2; the equation to calculate ITh at the subroutine 44 may be replaced by a corresponding equation to calculate the warp error correction ITw; the table 3H may be replaced by a coefficient table (3W) which is used to calculate the warp correction ITw; the table 4H may be replaced by a coefficient table (4W) which is used to calculate the warp correction ITw; ITH2, ITh at step 45 may be replaced by ITW2, ITw; and CH, Kh6, ITh in step 46 may be replaced by CW, Kw6, ITw. In this manner, a flow chart which represents the subroutine 53 to calculate the warp error CW in detail is obtained, and is executed by CPU 17.

When the heave error correction CH, the pitch error correction CP, the roll error correction CR, the warp error correction CW have been calculated, CPU 17 converts these corrections into suspension pressure correction EHfL (for the suspension 100fL), EHfr (for suspension 100fr), EHrL (for suspension 100rL) and EHrr (for suspension 100rr) for each of the wheels; thus, the suspension pressure correction is calculated as follows:

$$EHfL = KfL \cdot Kh7 \cdot (\tfrac{1}{4}) \cdot (CH - CP + CR + CW)$$
$$EHfr = Kfr \cdot Kh7 \cdot (\tfrac{1}{4}) \cdot (CH - CP - CR - CW)$$
$$EHrL = KrL \cdot Kh7 \cdot (\tfrac{1}{4}) \cdot (CH + CP + CR - CW)$$
$$EHrr = Krr \cdot Kh7 \cdot (\tfrac{1}{4}) \cdot (CH + CP - CR + CW)$$

Coefficients KfL, Kfr, KrL, Krr are correction coefficients which compensate for differences among suspension feed pressures due to differential lengths of the pipings leading to the suspensions 100fL, 100fr, 100rL, 100rr with respect to the line pressure reference 13rm and the return pressure reference 13rt. Kh7 represents a coefficient which increases or decreases a vehicle elevation deviation correction in accordance with the steering angular velocity Ss, and is read as a function of the steering angular velocity Ss from one region (table 5) of the internal ROM. It is expected that there will be a greater change in the attitude when the steering angular velocity Ss is high, so that the error in the attitude will also increase. Accordingly, the coefficient Khs is chosen to be substantially proportional to the steering angular velocity Ss. However, for a steering angular velocity Ss which is below a given level, which is chosen to be 50°/msec in the table 5, a change in the travelling direction will occur very slowly as is a change in the attitude. For a velocity Ss above 50°/msec and below 400°/msec, a change in the attitude will occur at a rate which is substantially proportional to the steering angular velocity Ss. At a steering angular velocity exceeding 400°/msec, a change in the attitude of the vehicle will occur very rapidly and excessively, and any excessive correction which rapidly compensates for such a rapid change in the attitude will degrade the stability of controlling the vehicle elevation. Accordingly, the correction coefficient Kh7 as a function of the steering angular velocity Ss is chosen to be a constant value for Ss at or below 50°/msec, to assume a high value which is substantially proportional to Ss for a range from 50°/msec to 400°/msec, and again assume a constant value which it assumes at 400°/msec when the velocity exceeds 400°/msec.

Figure 10C:
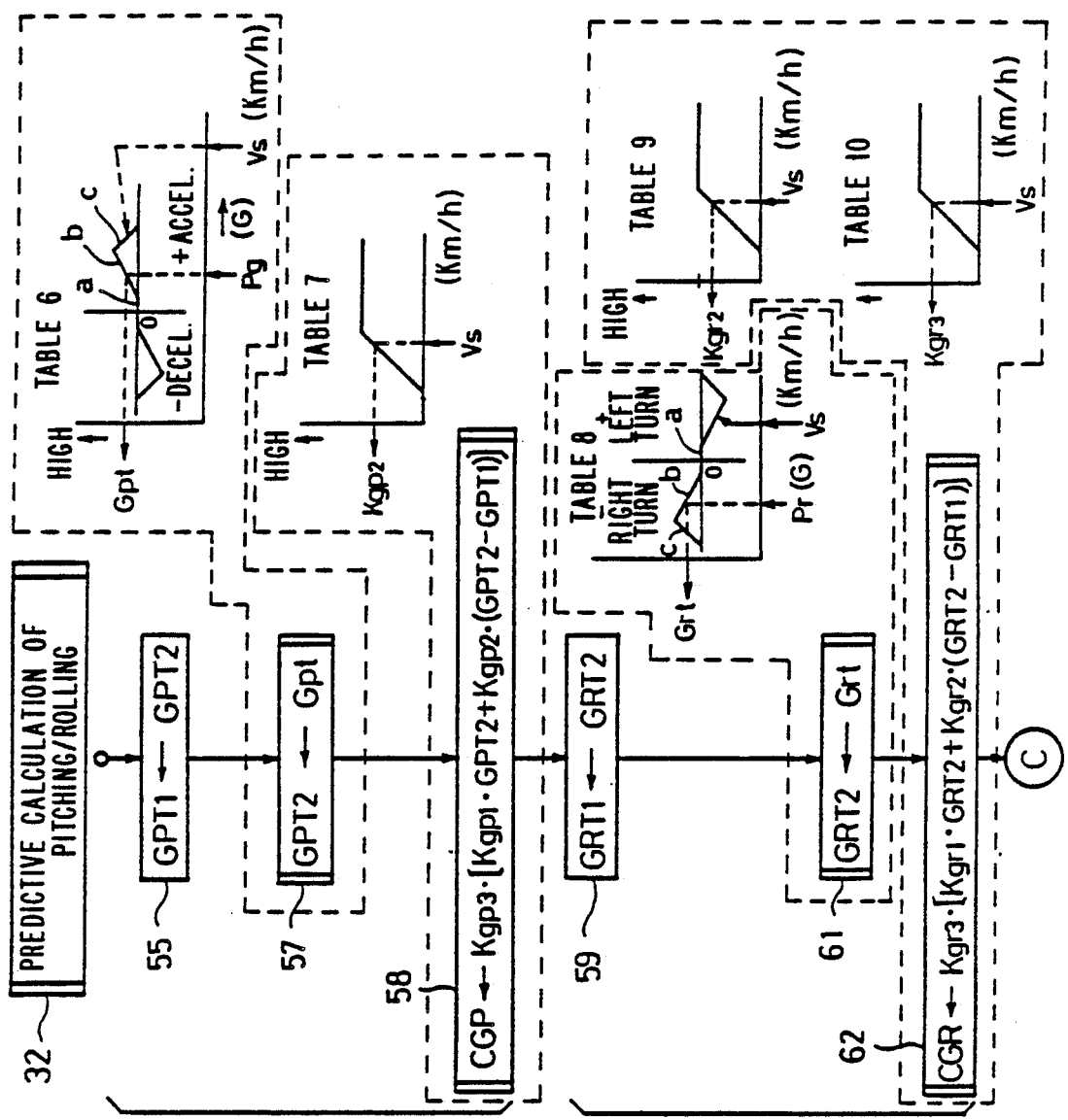

Referring to FIGS. 10c and 10d, the subroutine 32 which effects a predictive calculation of pitching/rolling will be described more specifically. The preceding subroutine 31 to calculate a deviation of vehicle elevation has served substantially regulating the suspension pressures, through a feedback control by determining the current vehicle elevation as well as the current attitude of the car body on the basis of the longitudinal and the lateral acceleration in order to maintain a proper attitude of the car body. By contrast, the subroutine 32 which effects a predictive calculation of pitching/rolling principally serves controlling the longitudinal and the lateral acceleration of the car body, thus suppressing a change in the longitudinal acceleration Pg and the lateral acceleration Rg of the car body.

Initially, CPU 17 calculates a correction CGT which is used to suppress a change in the pitch which is caused by a change in the longitudinal acceleration Pg (steps 55 to 58). At this end, the content of register GPT2 which stores the correction corresponding to Pg during the previous pass is written into register GPT1 (step 55), and a correction Gpt corresponding to Vs and Pg is read from one region (table 6) of the internal ROM and is written into register GPT2 (step 57). Data Gpt from the table 6 is specified for groups of Vs as index. Accordingly, CPU 17 initially specifies a particular group of Vs, and then reads data Gpt corresponding to Pt in a specified group. For each group, a deadband a has a width, as indicated by the horizontal width where Gpt0=0 in the table 6 shown in FIG. 10c, which is greater for a group having lesser values of Vs. In a region b, the gain is increased with an increase in the longitudinal acceleration Pg, thus enhancing the control performance. In a region c, the control performance is suppressed because of the likelihood that an abnormality is occurring with a sensor or sensors.

CPU 17 then calculates the correction CGP which is used to suppress a change in the longitudinal acceleration Pg according to the following equation, and writes it into register CGP (step 58):

$$CGP = Kgp3 \cdot [Kgp1 \cdot GPT2 + Kgp2 \cdot (GPT2 - GPT1)]$$

GPT2 represents the content of register GPT2, and represents the correction Gpt which is now read from the table 6. GPT1 represents the content of register GPT1, and is the correction which was read from the table 6 during the previous pass. P (proportional) term Kgp1·GPT2 has a factor of proportionality Kgp1.

D (differential) term Kgp2·(GPT2−GPT1) has a coefficient Kgp2, which is read from one region (table 7) of the internal ROM in correspondence to the vehicle speed Vs. "Table 7" shown in FIG. 10c illustrates generally that the coefficient Kgp2 assumes a greater value for a greater value of the vehicle speed Vs, thus increasing the significance of the differential term. This is because the differential term represents a correction which tends to suppress rapidly a change in the longitudinal acceleration Pg. This is because since the greater the vehicle speed, any change which occurs in the longitudinal acceleration pg as a result of a depression or release of a brake pedal, the operation of an accelerator pedal or a turning or turn back of a steering wheel occurs more rapidly, and hence such rapid change must be suppressed rapidly. On the other hand, for a vehicle speed Vs which exceeds a certain value, the depression or release of a brake pedal, the operation of an accelerator pedal or a turning or turn back of a steering wheel, if allowed to take place rapidly, will cause a very rapid and excessive change in the longitudinal acceleration Pg, and an excessive differential term which provides a rapid suppression of such rapid change will degrade the stability of suppressing the longitudinal acceleration. Accordingly, the coefficient Kgp2 in the table 7 is chosen to undergo a large variation when the vehicle speed Vs is low and assumes a constant value at and above a given value of the vehicle speed Vs. In this manner, the significance of the differential term changes greatly in response to a change in the vehicle speed, but the significance of the differential term ceases to change in response to a change in the vehicle speed when the vehicle speed Vs is high.

The calculated correction CGP which is used to suppress a change in the longitudinal acceleration Pg represents a pitch correction with respect to the suspension, and Kgp3 represents a weighting factor applied to roll corrections CGR and GES which will be described later.

CPU 17 then calculates a correction CGR which is used to suppress a change in the roll as caused by a change in the lateral acceleration or thus to suppress a change in the lateral acceleration Pg (steps 59 to 62). The content of register GRT2 which stores the correction corresponding to Rg which is obtained during the previous pass is written into register GRT1 (step 59), and a correction Grt corresponding to Vs and Rg is read from one region (table 8) of the internal ROM and is written inregister GRT2 (step 61). The data Grt in the table 8 is specified for groups of Vs as an index. Accordingly, CPU 17 specifies a particular group of Vs, and then reads data Grt corresponding to Rg within the specidied group. Each group has a deadband a having a width, as indicated by the lateral dimension of the line representing Grt=0 in the table 8 shown in FIG. 10c, which is greater for a group of Vs having lesser values. The purpose of a region b is to encrease the gain with an increased in the lateral acceleration Rg, thus enhancing the control performance. In a region c, the control performance is suppressed because of the likelihood that an abnormality is occurring with a sensor or sensors.

CPU 17 then calculates a correction CGR which is used to suppress a change in the lateral acceleration Rg according to the following equation, and writes it into register CGR (step 62):

$$CGR = Kgr3 \cdot [Kgr1 \cdot GRT2 + Kgr2 \cdot (GRT2 - GRT1)]$$

GRT2 represents the content of register GRT2, and is a correction Grt which is read from the table 8 during the current pass. GRT1 is the content of register GRT1, and is a correction which was read from the table 8 during the previous pass. P (proportional) term Kgr1·GRT2 has a factor of proportionality Kgr1.

D (differential) term Kgr2·(GRT2−GRT1) has a coefficient Kgr2, which is read from one region (table 9) of the internal ROM incorrespondence to the vehicle speed Vs. Generally, the coefficient Kgr2 has a greater value for a greater value of vehicle speed Vs, thus increasing the significance of the differential term. This is because the differential term represents a correction to suppress a change in the lateral acceleration Rg rapidly. It is desired to suppress any rapid change in the lateral acceleration Rg caused by a turning or turn back of a steering wheel for higher values of the vehicle speed.

On the other hand, for a vehicle speed Vs exceeding a certain value, the lateral acceleration Rg will change rapidly and excessively, if a turning or turn back of a steering wheel takes place rapidly. Any excessive differential term which is effective to provide a rapid suppression of such rapid change will degrade the stability of the suppressing of the lateral acceleration. Accordingly, the coefficient Kgr2 in the table 9 is chosen to undergo a large variation for low values of the vehicle speed Vs, and assumes a constant value for vehicle speed Vs which exceeds a given value. In this manner, the significance of the differential term changes greatly inresponse to a change in the vehicle speed when the vehicle speed Vs is low, but ceases to change when the vehicle speed Vs is higher.

The calculated correction CGR represents a roll correction for the suspension and Kgr3 represents a weighting factor applied to pitch correction CGP mentioned above and a roll correction GES which will be described later. Since the rate of change in the lateral acceleration Rg is low for low values of the vehicle speed Vs, the specific contribution of the roll correction CGR is reduces in a low speed range while the roll correction is given a constant value in a high speed range. The coefficient data Kgr3 is stored as a function of the vehicle speed Vs in one region (table 10) of the internal ROM so as to achieve such relationship. CPU 17 reads the coefficient Kgr3 corresponding to the speed Vs for use in the calculation of the correction CGR.

The lateral acceleration Rg changes in response to a change in the steering position or the steering angular velocity Ss, and the rate at which such change occurs also depends on the vehicle speed Vs. In other words, a change in the lateral acceleration Rg depends on both the steering angular velocity Ss and the vehicle speed Vs. Accordingly, a roll correction Ges which is required to suppress such change is written into one region (table 11) of the internal ROM of CPU 17. Referring to FIG. 10d, a roll correction Ges corresponding to a particular combination of Vs and Ss is read from the table 11, and is written into register GES (step 65). If it is substantially equal to zero, indicating that the steering angular velocity of the previous pass is equal to that of the current pass, the roll correction Ges read during the previous pass may be used as the roll correction for the current pass, and hence no updating of register GES (step 65) takes place.

CPU 17 then converts the calculated pitch correction CGP, roll correction CGR and the roll correction GES into the pressure corrections for each of the suspensions, and adds such pressure corrections to the values EHfL, EHfr, EHrL, EHrr (the content of registers EHFL, EHFR, EHRL, EHRR) which have been calculated during the subroutine 31, and utilize their sums EhfL, Ehfr, EhrL, Ehrr to update registers EHfL, EHfr, EHrL, EHrr (step 66).

$$EhfL = EHfL + KgfL \cdot (\tfrac{1}{2}) \cdot (-CGP + Kcgrf \cdot CGR + KgefL \cdot GES)$$

$$Ehfr = EHfr + Kgfr \cdot (\tfrac{1}{2}) \cdot (-CGP - Kcgrf \cdot CGR - Kgefr \cdot GES)$$

$$EhrL = EHrL + KgrL \cdot (\tfrac{1}{2}) \cdot (CGP + Kcgrr \cdot CGR - KgerL \cdot GES)$$

-continued $$Ehrr = EHrr + Kgrr \cdot (\tfrac{1}{2}) \cdot (CGP - Kcgrr \cdot CGR + Kgerr \cdot GES)$$

The first term on the right side represent values calculated during the subroutine 31 which were written into registers EHfL, EHfr, EHrL, EHrr while the second term on the right side represents the pitch correction CGP, the roll correction CGR and the roll condition GES mentioned above which have been converted into pressure corrections for the respective suspensions. The coefficients KgfL, Kgfr, KgrL and Kgrr appearing in the second term of the right hand are related as follows:

$$KgfL = KfL \cdot Kgs$$
$$Kgfr = Kfr \cdot Kgs$$
$$KgrL = KrL \cdot Kgs$$
$$Kgrr = Krr \cdot Kgs$$

KfL, Kfr, KrL, Krr are coefficients which are used to correct pressure errors caused by variations among the piping length leading to the respective suspension with respect to the pressure reference while Kgs represents a coefficient which has a predetermined relationship with the steering angular velocity Ss as indicated in the table 12 and which defines a weighting factor applied to the pressure correction which is calculated in the subroutine 32 and used to suppress a change in the acceleration such as the second term in the right of above four equations, $$(\tfrac{1}{2}) \cdot (-CGP + KcgrL \cdot CGR + KgefL \cdot GES),$$

relative to the pressure correction calculated in the subroutine 31. Since it is expected that a change in the acceleration will occur rapidly for a greater value of the steering angular velocity Ss, it is preferred to choose a greater weighting factor for the pressure correction which is used to suppress a change in the acceleration. Accordingly, the coefficient Kgs is generally chosen to be greater in proportion to the steering angular velocity Ss. However, for a steering angular velocity Ss, at or below a given level, which is chosen to be 50°/msec in the table 12, a change in the acceleration will be minimal. For a range from 50°/msec to 400°/msec, the acceleration will change at a rate which is substantially proportional to the steering angular velocity Ss. For a steering angular velocity exceeding 400°/msec, a change in the turning radius will occur rapidly and excessively, causing an excessively large change in the acceleration in particular in the lateral acceleration. An excessive correction which provides a rapid compensation of such a rapid change in the acceleration will degrade the stability of controlling the acceleration. Accordingly, the weighting factor Kgs is chosen as a function of the velocity Ss. Specifically, it assumes a constant value for Ss at or below 50°/msec, and assumes a higher value which is substantially proportional to Ss for a range from 50°/msec to 400°/msec, and again assumes a constant value which is equivalent to the value reached at 400°/msec when 400°/msec is exceeded.

CPU 17 then adds the initial pressure data which are stored in the initial pressure registers PFLo, PFRo, PRLo, PRRo and which have been determined at steps 16 to 18 to the sum of the correction pressure used to regulate a deviation in the vehicle elevation and the correction pressure used to control suppressing the acceleration which is calculated in a subroutine 66 (the content of registers EHfL, EHfr, EHrL, EHrr), thus determining the pressures to be applied to the individual suspensions and updating registers EHfL, EHfr, EHrL, EHrr with these values (step 67).

Figure 10E:
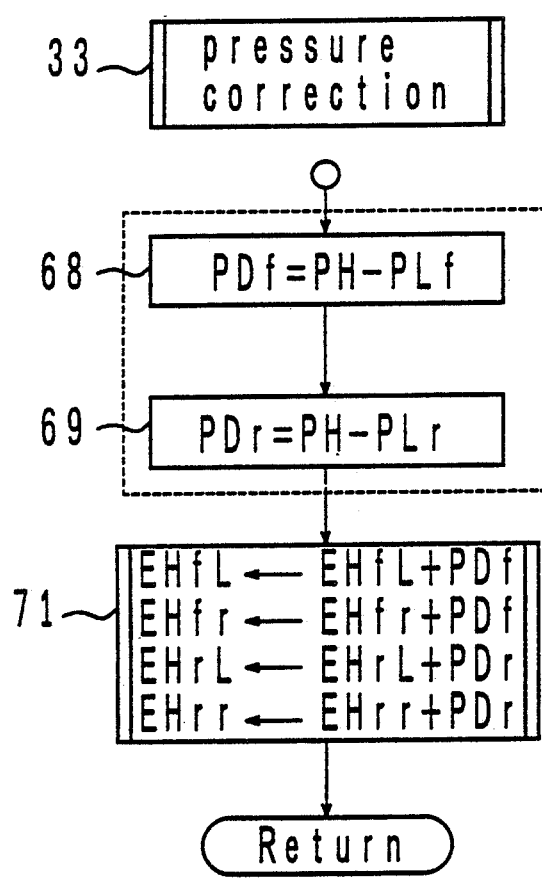
Figure 10E:
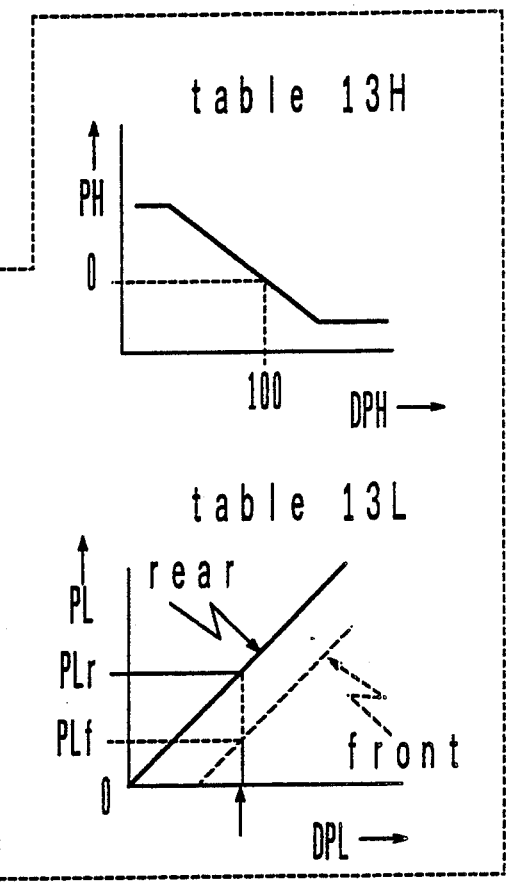

Referring to FIG. 10e, the subroutine 33 which effects "pressure correction" will be described. CPU 17 reads a correction PH, which is designed to compensate an error or a deviation of the output pressure of the pressure control valves due to a change or a fluctuation of the line pressure, corresponding to the pressure Dph (the content of register DPH) detected by the pressure sensor 13rm from a region (table 13H shown in FIG. 10e) of the internal ROM and reads a correction PLf for front wheel side and a correction PLr for rear wheel side, which are designed to compensate an error or a deviation of the output pressure of the pressure control valves due to a change or a fluctuation of the return pressure, corresponding to the pressure DpL (the content of register DPL) detected by the pressure sensor 13rt from a region (table 13L shown in FIG. 10e) of the internal ROM. Then CPU 17 calculates pressure correction values PDf=PH−PLf (for front wheel side) and PDr=PH−PLr (for rear wheel side) for compensating the errors of the output pressure of the pressure control valves due to the change or fluctuation of the line pressure and the return pressure (steps 68 and 69). Since the distance from the reservoir 2 to the suspensions of front wheel side is shorter than that from the reservoir 2 to the suspensions of rear wheel side, since the return pressure sensor 13rt detects the return pressure at the rear wheel side and since the return pressure difference between the front wheel side and the rear wheel side is relatively high, the pressure corrections of each suspension responding to the return pressure is separated as described for reducing error of the pressure compensation. As indicated by "table 13L" in FIG. 10e, it includes two groups of correction values, one of which is assigned to the front wheel side and the other to the rear wheel side. CPU 17 reads a correction value which corresponds to the return pressure detected by the sensor 13rt from the group assigned to the front wheel side for the suspensions of the front wheel side and reads a correction value from the other group assigned to the rear wheel side for the suspensions of the rear wheel side.

After the calculation of the corrections PDf and Pdr, CPU 17 adds each one of them to the contents in the registers EHfL, EHfr and EHrL, EHrr and writes the resulting sums into the registers HfL, EHfr, EHrL, EHrr (subroutine 71).

Figure 10F:
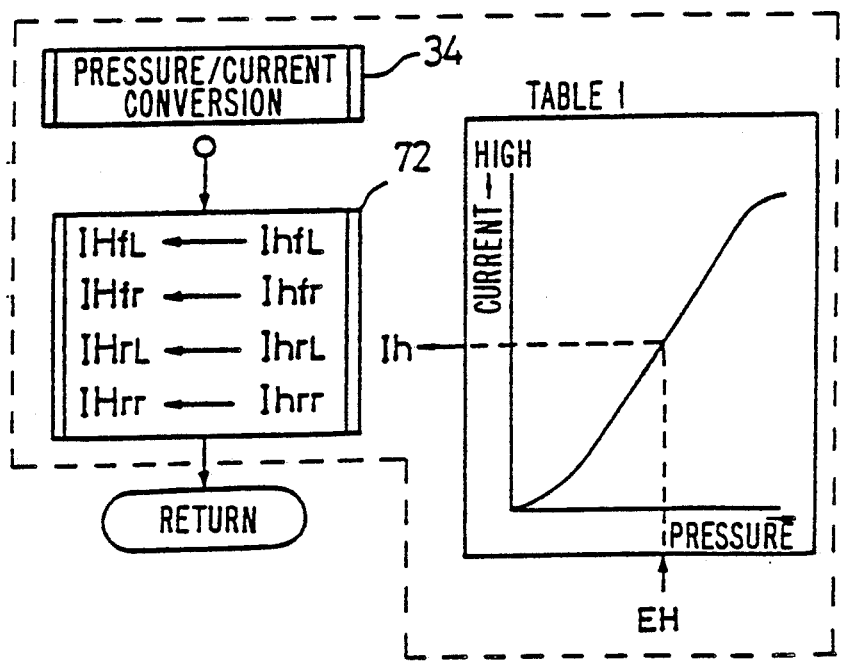

Referring to FIG. 10f, the subroutine 34 for "pressure-current conversion" will be described in detail. CPU 17 reads current levels IhfL, Ihfr, IhrL, Ihrr which are to be applied to the pressure control valves 80fL, 80fr, 80rL and 80rr, respectively, in order to produce the pressures indicated by data EHfL, EHfr, EHrL and EHrr of registers EHfL, EHfr, EHrL, EHrr from pressure/current conversion table 1, and write them into current output registers IHfL, IHfr, IHrL and IHrr (step 34).

Figure 10G:
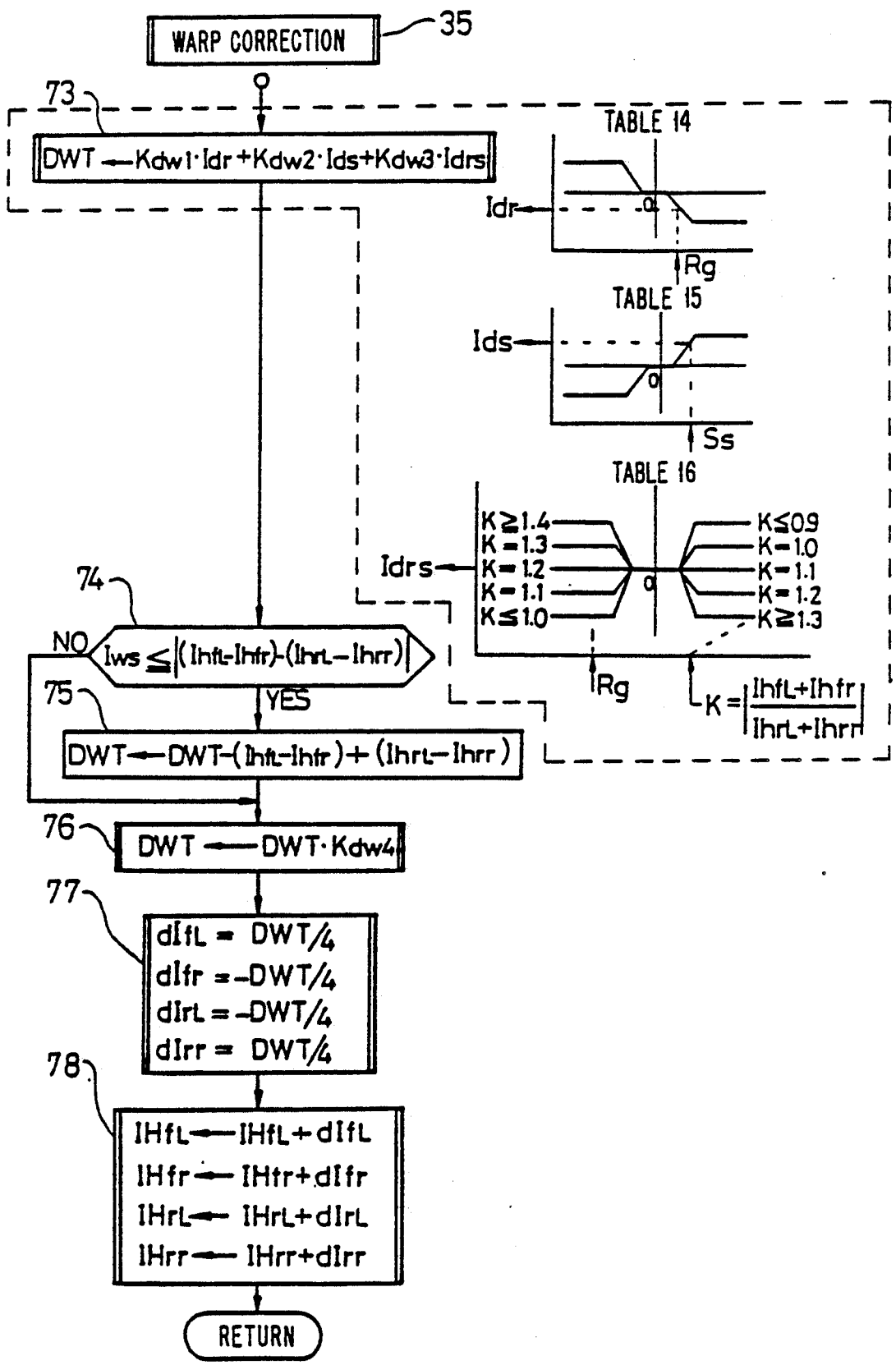

Referring to FIG. 10g, the subroutine 35 for "warp correction" will now be described. In the subroutine 35, an appropriate target warp DWT is calculated on the basis of the lateral acceleration Rg and the steering angular velocity Ss (step 73), and a warp which would result when the content of registers IHfL, IHfr, IHrL, IHrr is delivered is also calculated. Its error warp with respect to the target warp DWT is calculated (step 77), and current corrections dIfL, dIfr, dIrL, dIrr which are required to reduce the error warp to zero are calculated (step 77), and these current corrections are added to the content of registers IHfL, IHfr, IHrL, IHrr, with these registers updated by the resulting sum (step 78).

One region (table 14) of the internal rom of CPU 17 has warp target values Idr stored therein in a manner corresponding to the magnitude of the lateral acceleration Rg. Also table 15 has warp target values Ids stored therein which correspond to the steering angular velocity Ss. Table 16 has warp corrections Idrs stored therein which correspond to the inclination of the car body in the fore-and-aft direction as well as the lateral acceleration Rg (representing the inclination in the lateral direction) as defined by the values in registers IHfL, IHfr, IHrL, IHrr which are to be delivered. It is to be understood that the inclination in the fore-and-aft direction is indicated as follows:

$$K = |(IhfL + Ihfr)/(IhrL + Ihrr)|$$

Table 16 includes groups of data corresponding to different magnitudes of K, and data in each group is given in correspondence to the lateral acceleration Rg.

CPU 17 reads warp target value Idr corresponding to the lateral acceleration Rg from table 14, reads warp target value Idr corresponding to the steering angular velocity Ss, and reads the warp correction Idrs corresponding to the inclination in the fore-and-aft direction as well as in the lateral direction, as defined by the values in registers IHfL, IHfr, IHrL, IHrr from table 16, and calculates warp target value DWT as follows (step 73):

$$DWT = Kdw1 \cdot Idr + Kdw2 \cdot Ids + Kdw3 \cdot Idrs$$

CPU 17 then calculates a warp, which is defined as follows:
(IhfL−Ihfr)−(IhrL−Ihrr)

as defined by the content of registers IHfL, IHfr, IHrL, IHrr, and examines if it remains within a permissible range or deadband (step 74). If it is out of the permissible range, the calculated warp (IhfL−Ihfr)−(IhrL−Ihrr) is subtracted from the target warp DWT, and the result is written into a warp error correction register DWT (step 75). If it remains within the permissible range, the content (DWT) of the register DWT remains unchanged. The warp error correction DWT (the content of register DWT) is multiplied by the weighting factor Kdw4 to provide a product, which is used to update register DWT (step 76). The warp error correction DWT is converted into a correction for each of the suspension pressures, or more exactly, a correction to be applied to the current setting of the respective pressure control valve which corresponds to the pressure correction (step 77), and the resulting correction is added to the content of current output registers IHfL, IHfr, IHrL, IHrr (step 78).

Data from these current output registers IHfL, IHfr, IHrL, IHrr are transferred to CPU 18 so as to be supplied to the pressure control valves 80fL, 80fr, 80rL, 80rr during the output subroutine 36, and CPU 18 applies them to the duty controller 32.

Referring to FIGS. 9a to 9c, CPU 17 controls the output pressure of the pressure control valve 80fL, 80fr, 80rL, 80rr when the line pressure Dph is equal to or greater than the first predetermind value Phs (steps 15 to 37). However, the "calculate deviation in elevation" (subroutine 31) including "calculation of heave error CH" (subroutine 50: FIG. 10a), "calculation of pitching error CP" (subroutine 51: FIG. 10b), "calculation of rolling error CR" (subroutine 52: FIG. 10b), "calculation of warp error CW" (subroutine 53: FIG. 10b) and calculation of output pressure (subroutine 54: FIG. 10b) is skipped over when the line pressure Dph is below the second predetermined value Phc (step 25B). Thus the output pressures of the pressure control valves 80fL, 80fr, 80rL, 80rr are substantially equal to the initial pressures PFLo, PFRo, PRLo, PRRo.

As shown in FIG. 12, the cut valve 70fr (70fL, 70fr, 70rL, 70rr) turn to open state when the line pressure Dph is greater than the first predetermined value Phs and is below the second predetermined value Phc. Therefore, the output pressures of the pressure control valves 80fL, 80fr, 80rL, 80rr are substantially equal with the pressures of the suspensions 100fL, 100fr, 100rL, 100rr when the cut valves 70fL, 70fr, 70rL, 70rr turn to open state. Thus opening of the cut valves 70fL, 70fr, 70rL, 70rr do not arise any shock or abrupt change of the pressures of the suspensions 100fL, 100fr, 100rL, 100rr.

"Predictive calculation of pitching/rolling" (subroutine 32: FIGS. 10c and 10d) controls the longitudinal and the lateral acceleration of the car body in response to the longitudinal and the lateral acceleration detected by the onboard longitudinal and lateral acceleration sensors 16p and 16r as shown in FIG. 10c and described above. The "predictive calculation of pitching/rolling" (subroutine 32) starts when the line pressure Dph rises to the first predetermined value Phs, in other wards the "predictive calculation of pitching/rolling" (subroutine 32) starts before the cut valves 70fL, 70fr, 70rL, 70rr turn to open. Therefore, if the vehicle is parked on a slope or in an attitude in which a front or rear wheel is on an edge of a sidewalk, namely the vehicle is parked in an inclined attitude, the output pressures of pressure control valves for the wheel which are at lower position of the inclination may change abruptly when the line pressure rises up to the first predetermined value Phs as shown in FIG. 12. At this time, however, the cut valves 70fL, 70fr, 70rL, 70rr are closed. So that the pressures of the suspensions 100fL, 100fr, 100rL, 100rr do not change at this time. In a short moment (ST) later, the D (differential) terms GPT2−GPT1 and GRT2−GRT1 become to zero. Since the D terms are zero and the coefficient Kgr3 is a very small value when the vehicle is parking (namely Vs=0), the pressure compensation value CGP, CGR are negligible as compared with the initial pressures PFLo, PFRo, PRLo, PRRo. Therefore the pressures of the suspensions 100fL, 100fr, 100rL, 100rr do not change abruptly when the cut valves 70fL, 70fr, 70rL, 70rr turn to open even if the vehicle is parked on a slope or in an attitude in which a front or rear wheel is on an edge of a sidewalk, namely the vehicle is parked in an inclined attitude.

When the line pressure Dph rises up to the second predetermined value Phc and CPU 17 starts "calculate deviation in elevation" (subroutine 31) including "calculation of heave error CH" (subroutine 50: FIG. 10a), "calculation of pitching error CP" (subroutine 51: FIG. 10b), "calculation of rolling error CR" (subroutine 52: FIG. 10b), "calculation of warp error CW" (subroutine 53: FIG. 10b) and calculation of output pressure (subroutine 54: FIG. 10b). "Calculation of heave error CH" (subroutine 50: FIG. 10a) has no relation with the longitudinal and lateral accelerations detected by the sensors 16p and 16r, whereas "calculation of pitching error CP" (subroutine 51: FIG. 10b) and "calculation of rolling error CR" (subroutine 52: FIG. 10b) calculate pressure corrections CP and CR in response to the longitudinal and lateral accelerations detected by the sensors 16p and 16r. However, coefficients (Kp4, Kp5, Kr4, Kr5, Kh7) for calculating the corrections CP and CR are small due to Vs=0 and Ss=0 (vehicle is parking) when the line pressure Dph rises to the second predetermined value Phc. Therefore, the pressures of the suspensions 100fL, 100fr, 100rL, 100rr do not change abruptly when the line pressure Dph rises up to the second predetermined value Phc and CPU 17 starts "calculate deviation in elevation" (subroutine 31). After the initiation of "calculate deviation in elevation" (subroutine 31), the pressures of the suspensions 100fL, 100fr, 100rL, 100rr (output pressures of the pressure control valves 80fL, 80fr, 80rL, 80rr) are compensated so as to turn the actual height of the vehicle in a target height responding to a change or deviation of the actual height from the target height.

While a preferred embodiment of the invention have been illustrated and described, it is to be understood that here is no intention to limit the invention to the precise constructions disclosed herein and the right is reserved to all changes and modifications coming within the scope of the invention as defined in the appended claims.

What we claimed is:

1. A pressure control system for suspension comprising:
   a pressure control valve which is interposed between an actuator in a suspension mechanism and a pressure source;
   a cut valve which cuts off a fluid path from the pressure control valve to the actuator when a pressure of the pressure source is below a predetermined value and communicates the fluid path when the pressure of the pressure source exceeds the predetermined value;
   an acceleration detector which detects an acceleration of a vehicle body on the suspension mechanism; and
   an electronic controller for initiating, before the cut valve opens the fluid path from the pressure source to the pressure control valve, an attitude control in which the controller calculate a pressure compensation value in accordance with an acceleration detected by the acceleration detector for suppressing a change of an attitude of the vehicle body which might be caused by the acceleration of the vehicle body and indicates an adjustment of a pressure by the calculated compensation value to the pressure control valve.

2. A pressure control system for suspension as defined in claim 1, wherein the acceleration detector is a longitudinal acceleration sensor which detects a longitudinal acceleration of the vehicle, and the electronic controller, in the attitude control, reads a correction Gpt corresponding to a longitudinal acceleration Pg detected by the sensor from a memory means, and calculates a compensation value CGP which is used to suppress a change in the longitudinal acceleration Pg according to an equation including a proportional term and a differential term with respect to the correction Gpt.

3. A pressure control system for suspension as defined in claim 1, wherein the acceleration detector is a lateral acceleration sensor which detects a lateral acceleration of the vehicle, and the electronic controller, in the attitude control, reads a correction Grt corresponding to a lateral acceleration Pr detected by the sensor from a memory means, and calculates a compensation value CGR which is used to suppress a change in the lateral acceleration Pr according to an equation including a proportional term and a differential term with respect to the correction Grt.

4. A pressure control system for suspension comprising:
- a pressure control valve which is interposed between an actuator in a suspension mechanism and a pressure source;
- a cut valve which cuts off a fluid path from the pressure control valve to the actuator when a pressure of the pressure source is below a predetermined value and communicates the fluid path when the pressure of the pressure source exceeds the predetermined value;
- an longitudinal acceleration detector which detects a longitudinal acceleration of a vehicle body on the suspension mechanism;
- a lateral acceleration detector which detects a lateral acceleration of the vehicle body; and
- an electronic controller for initiating, before the cut valve opens the fluid path from the pressure source to the pressure control valve, an attitude control in which the controller calculate pressure compensation values in accordance with longitudinal and lateral accelerations detected by the longitudinal and lateral acceleration detectors for suppressing a change of an attitude of the vehicle body which might be caused by the longitudinal and lateral accelerations of the vehicle body and indicates an adjustment of a pressure by the calculated compensation value to the pressure control valve.

5. A pressure control system for suspension as defined in claim 4, wherein the electronic controller, in the attitude control, reads corrections Gpt and Grt corresponding to longitudinal and lateral accelerations Pg and Pr detected by the longitudinal and lateral acceleration detectors from a memory means, and calculates compensation values CGP and CGR which are used to suppress changes in the longitudinal and lateral accelerations Pg and Pr according to equations each one of which including a proportional term and a differential term with respect to each one of the corrections Gpt and Grt.

* * * * *